US012562320B2

(12) United States Patent
Dai et al.

(10) Patent No.: US 12,562,320 B2
(45) Date of Patent: Feb. 24, 2026

(54) HIGH-VOLTAGE DC RELAY WITH PERMANENT MAGNET ARC EXTINGUISHING FUNCTION

(71) Applicant: Xiamen Hongfa Electric Power Controls Co., Ltd., Xiamen (CN)

(72) Inventors: Wenguang Dai, Xiamen (CN); Liji Su, Xiamen (CN); Wenhao Hua, Xiamen (CN); Songsheng Chen, Xiamen (CN); Meng Wang, Xiamen (CN); Yaoshan Hong, Xiamen (CN)

(73) Assignee: Xiamen Hongfa Electric Power Controls Co., Ltd., Xiamen (CN)

( * ) Notice: Subject to any disclaimer, the term of this patent is extended or adjusted under 35 U.S.C. 154(b) by 206 days.

(21) Appl. No.: 18/547,399

(22) PCT Filed: Feb. 8, 2022

(86) PCT No.: PCT/CN2022/075540
§ 371 (c)(1),
(2) Date: Aug. 22, 2023

(87) PCT Pub. No.: WO2022/179393
PCT Pub. Date: Sep. 1, 2022

(65) Prior Publication Data

US 2024/0145188 A1 May 2, 2024

(30) Foreign Application Priority Data

Feb. 26, 2021 (CN) ......................... 202110220485.5
Jul. 16, 2021 (CN) ......................... 202110807850.2

(51) Int. Cl.
*H01H 9/44* (2006.01)
*H01H 50/38* (2006.01)

(52) U.S. Cl.
CPC ............ *H01H 9/443* (2013.01); *H01H 50/38* (2013.01)

(58) Field of Classification Search
None
See application file for complete search history.

(56) References Cited

U.S. PATENT DOCUMENTS 4,424,428 A 1/1984 Bernard et al.
5,519,370 A 5/1996 Perreira et al.
(Continued)

FOREIGN PATENT DOCUMENTS

CN 103515153 A 1/2014
CN 104882335 A 9/2015
(Continued)

OTHER PUBLICATIONS

Notice of Allowance for CN Patent Application No. 202110807850.2 of Sep. 23, 2024.
(Continued)

*Primary Examiner* — Bernard Rojas
(74) *Attorney, Agent, or Firm* — Perilla Knox & Hildebrandt LLP; Kenneth A. Knox

(57) ABSTRACT

A high-voltage DC relay with permanent magnet arc extinguishing function includes two static contact leading-out terminals having static contacts; a movable contact piece having movable contacts; first permanent magnets around the movable contact piece, wherein a side having polarity of the first permanent magnets faces the contacts such that arc extinction is implemented using a horizontal magnetic field formed by the first permanent magnets; and third permanent magnets provided on the static contact leading-out terminals, the polarity of the sides facing the contacts of the third permanent magnets is opposite to that of the first permanent magnets such that magnetic field strength at the contacts can
(Continued)

be enhanced by a longitudinal magnetic field formed by the first and the third permanent magnets, and arc extinction can be implemented.

14 Claims, 17 Drawing Sheets

(56) References Cited

U.S. PATENT DOCUMENTS

| | | | | |
|---|---|---|---|---|
| 9,117,605 | B2 * | 8/2015 | An | H01H 50/163 |
| 12,068,121 | B2 * | 8/2024 | Yoo | H01H 50/045 |
| 12,087,531 | B2 * | 9/2024 | Jeong | H01H 50/54 |
| 2012/0181860 | A1 | 7/2012 | Hsu et al. | |
| 2013/0063232 | A1 | 3/2013 | Takaya et al. | |
| 2013/0127571 | A1 * | 5/2013 | Takaya | H01H 33/60 335/201 |
| 2015/0194284 | A1 * | 7/2015 | Uruma | H01H 50/546 335/179 |

FOREIGN PATENT DOCUMENTS

| | | | |
|---|---|---|---|
| CN | 106960766 | A | 7/2017 |
| CN | 109659198 | A | 4/2019 |
| CN | 109671593 | A | 4/2019 |
| CN | 209658107 | U | 11/2019 |
| CN | 110690079 | A | 1/2020 |
| CN | 111091987 | A | 5/2020 |
| CN | 210467722 | U | 5/2020 |
| CN | 113178359 | A | 7/2021 |
| CN | 214505390 | U | 10/2021 |
| CN | 215869142 | U | 2/2022 |
| JP | H06506316 | A | 7/1994 |
| JP | 2010010057 | A | 1/2010 |
| JP | 2012038683 | A | 2/2012 |
| JP | 2013140796 | A | 7/2013 |
| JP | 2019029526 | A | 2/2019 |
| JP | 2020027730 | A | 2/2020 |
| KR | 20130136978 | A | 12/2013 |

OTHER PUBLICATIONS

First Office Action for CN Patent Application No. 202110220485.5 of Nov. 30, 2024.

Extended European Search Report for EP Patent Application No. 22758758.1 of Nov. 25, 2024.

Notice of Allowance for JP Patent Application No. 2023-536011 of Oct. 22, 2024.

International Search Report for International Application No. PCT/CN2022/075540 of Apr. 22, 2022.

Second Office Action for KR Patent Application No. 10-2023-7019225 of Jul. 15, 2025.

First Office Action for JP Patent Application No. 2024-203020 of Sep. 24, 2025.

* cited by examiner

HIGH-VOLTAGE DC RELAY WITH PERMANENT MAGNET ARC EXTINGUISHING FUNCTION

CROSS-REFERENCE TO RELATED APPLICATIONS

This disclosure is a national stage application under 35 U.S.C. § 371 of International Application No. PCT/CN2022/075540, filed on Feb. 8, 2022, which is based upon, claims the benefit of, and claims priority to Chinese Patent Application No. 202110807850.2 filed on Jul. 16, 2021 and Chinese Patent Application No. 202110220485.5 filed on Feb. 26, 2021, the contents of all of which are incorporated by reference in their entireties herein.

TECHNICAL FIELD

The present disclosure relates to the technical field of a relay and, in particular, to a high-voltage DC relay with permanent magnet arc extinguishing function.

BACKGROUND

Existing DC relays generally adopt a direct acting movable contact piece (also called a direct acting solenoid) that has contact portions including two static contacts and one movable contact piece. The two static contacts are generally installed at a top of a ceramic cap, and have bottom ends (i.e., leading-out terminals of the static contact points) extending into the ceramic cap. The movable contact piece is directed and distributed within the ceramic cap, and two ends of the movable contact piece serving as movable contacts are respectively cooperated with the two static contacts as the bottom ends of the static contact points. The movable contacts on the two ends of the movable contact piece are in contact with the static contact points on the bottom ends of the two static contacts. Current flows in from one of the static contacts, passes through the movable contact piece, and then flows out of the other static contact. The movable contact piece is installed at one end of a pushing rod, and the other end of the pushing rod is connected with a movable iron core of a magnetic part. When a coil is powered on by current to make the pushing rod move upwards, the two ends of the movable contact piece are in contact with two static contacts, respectively, to communicate with a load. When the coil is powered off, the pushing rod moves downwards under the action of a reset spring, and the two ends of the movable contact piece are separated from the two static contacts respectively to cut off the load.

In the existing high-voltage DC relay, a permanent magnet is generally employed to extinguish the arc, that is, an arc is blown using magnetic field generated by arranging permanent magnets around the contacts. The most typical permanent magnet configuration is to arrange a permanent magnet outside the either end of the movable contact piece in a length direction, such double permanent magnets have a good arc blowing direction and meet the requirements of non-polarity; however its magnetic field strength is weak (especially at the arc starting point and at a center of the leading-out terminal), so that for large-load products, having a large ceramic cavity, which makes the magnetic field strength of the arc extinguishing part reach the arc starting point small, and then the initial arc extinguishing effect is poor, it may not be possible to extinguish the arc in time under the limited condition. Therefore, the high-voltage DC relay in the related art cannot satisfy the improvement of a system load for new energy vehicles and energy storage projects.

BRIEF SUMMARY

A high-voltage DC relay capable of longitudinally drawing arc includes two static contact leading-out terminals and one movable contact piece; the movable contact piece being arranged under the two static contact leading-out terminals, and two ends of the movable contact piece functioned as movable contacts being respectively cooperated with bottom ends of the two static contact leading-out terminals functioned as static contacts; first permanent magnets being respectively arranged at positions corresponding to the contacts around the movable contact piece, and a side having polarity of each of the first permanent magnets faces the corresponding contact, such that arc extinction is implemented using a horizontal magnetic field formed by the first permanent magnets; under the movable contact piece, second permanent magnets are arranged at a position where the static contacts are in contact with the movable contacts, and polarity of a contact-facing sides of the second permanent magnets is opposite to the polarity of the contact-facing sides of the first permanent magnets, such that the magnetic field strength at the contacts can be enhanced using a longitudinal magnetic field formed by the first permanent magnets and the second permanent magnets at the static and movable contacts, and then the arc extinction can be implemented.

According to some embodiments of the present disclosure, two first permanent magnets are provided, and the two first permanent magnets are respectively arranged outside the two ends of the movable contact piece in a length direction, the two second permanent magnets are respectively arranged on two sides of the movable contact piece in a length, and each of the two second permanent magnets is arranged between a middle portion of the movable contact piece in the length direction and a position where the static contact is in contact with the movable contact at the corresponding end of the movable contact piece. A projection of the second permanent magnet on a reference horizontal plane falls into a projection of an area between the two first permanent magnets on the reference horizontal plane.

According to some embodiments of the present disclosure, two second permanent magnets corresponding to the positions where the two static contacts are in contact with the movable contacts are an integrated structure.

According to some embodiments of the present disclosure, two first permanent magnets are provided, and the two first permanent magnets are respectively arranged outside the two ends of the movable contact piece in a length direction. An anti-short circuit ring is further provided in the middle portion of the movable contact piece in the length direction. The two second permanent magnets are respectively arranged on two sides of the movable contact piece in a length direction, and each of the two second permanent magnets is arranged between an edge of the anti-short circuit ring and a position where the static contact is in contact with the movable contact at the corresponding end of the movable contact piece. A projection of the second permanent magnet on a reference horizontal plane falls into a projection of an area between the two first permanent magnets on the reference horizontal plane.

According to some embodiments of the present disclosure, the bottom of the two ends of the movable contact piece in the length direction are provided with first grooves that are recessed upward right under the positions where the static contacts are correspondingly in contact with the movable contacts, and the two second permanent magnets are respectively embedded into the first grooves at the two ends of the movable contact piece in the length direction.

According to some embodiments of the present disclosure, a yoke plate is also arranged under the movable contact piece, and each of the two second permanent magnets is provided in an area between the movable contact piece and the yoke plate.

According to some embodiments of the present disclosure, a yoke plate is further arranged under the movable contact piece, and the two second permanent magnets are respectively mounted on the yoke plate.

According to some embodiments of the present disclosure, the DC relay further includes two first U-shaped yokes respectively arranged to the two first permanent magnets, a U-shaped bottom wall of each of the two first U-shaped yokes is in contact with a side of the corresponding one of the first permanent magnets facing away from the corresponding contact, and the U-shaped side walls of each of the two first U-shaped yokes are respectively arranged on two sides of the movable contact piece in the width direction and are opposite to the corresponding contacts.

According to some embodiments of the present disclosure, a projection of the position where the movable contacts are in contact with the static contacts on a reference horizontal plane falls into a projection of the frame-shaped outline surrounded by the first U-shaped yokes on the reference horizontal plane.

According to some embodiments of the present disclosure, four first permanent magnets are provided, and the four first permanent magnets are respectively arranged outside the two ends of the movable contact piece and are opposite to the corresponding static and movable contacts, and polarities of the contact-facing sides of the two first permanent magnets facing the same static and movable contacts are set to be the same; and the two second permanent magnets are respectively arranged under the positions where the two static contacts are correspondingly in contact with the movable contacts. A projection of the second permanent magnet on a reference horizontal plane falls into a projection of an area between the two first permanent magnets corresponding to the same static and movable contacts on the reference horizontal plane.

According to some embodiments of the present disclosure, the two second permanent magnets are located right under the positions where the two static contacts are correspondingly in contact with the movable contacts, and the projection of the second permanent magnets on the reference horizontal plane falls into the projection of the middle connecting lines of the two first permanent magnets corresponding to the same static and movable contacts on the reference horizontal plane.

According to some embodiments of the present disclosure, the DC relay further includes two second U-shaped yokes arranged on the four first permanent magnets, wherein the U-shaped bottom wall of each of the two second U-shaped yokes corresponds to the outer side of each of the two ends of the movable contact piece in the length direction, and the U-shaped side walls of each of the two second U-shaped yokes are respectively arranged on the two sides of the movable contact piece in the width direction and in contact with one side facing away from the corresponding contacts of the first permanent magnets at the corresponding position.

According to some embodiments of the present disclosure, the movable contact piece corresponds to the middle portion of each of the first permanent magnets in a height direction.

The present disclosure further provides a high-voltage DC relay with permanent magnet arc extinguishing function includes two static contact leading-out terminals and one movable contact piece; the movable contact piece being arranged under the two static contact leading-out terminals, and two ends of the movable contact piece functioned as movable contacts being respectively cooperated with bottom ends of the two static contact leading-out terminals functioned as static contacts; first permanent magnets being respectively arranged at positions corresponding to the contacts around the movable contact piece, and a side having polarity of each of the first permanent magnets faces the corresponding contact, such that arc extinction is implemented using a horizontal magnetic field formed by the first permanent magnets, wherein the third permanent magnets are further installed to a side facing away from the static contacts in the two static contact leading-out terminals, and sides having polarity of the third permanent magnets face the corresponding contacts, and polarity of the sides facing the contacts of the third permanent magnets is opposite to polarity of the sides facing the contacts of the first permanent magnets, such that magnetic field strength at the contacts can be enhanced by a longitudinal magnetic field formed by the first permanent magnets and the third permanent magnets, and then arc extinction can be implemented.

According to some embodiments of the present disclosure, second grooves recessed downward are disposed at upper ends of the static contact leading-out terminals, and the third permanent magnets are embedded into the second grooves to be close to the corresponding contacts.

According to some embodiments of the present disclosure, the third permanent magnet is circular, a section of the second groove is a circular shape corresponding to that of the third permanent magnet, the third permanent magnet is located in a middle of the static contact leading-out terminals in a respective same horizontal plane.

According to some embodiments of the present disclosure, the two movable contacts are protrusions integrally formed at the two ends of the movable contact piece.

According to some embodiments of the present disclosure, two first permanent magnets are provided, and the two first permanent magnets are respectively arranged outside the two ends of the movable contact piece in a length direction; the protrusions at the two ends of the movable contact piece are respectively in eccentric contact with the bottom ends of the two static contact leading-out terminals.

According to some embodiments of the present disclosure, the protrusions at the two ends of the movable contact piece are respectively arranged at edges of the two ends of the movable contact piece; positions where the two static contact leading-out terminals are in contact with the protrusions at the two ends of the movable contact piece are at an opposite outer side of the bottom ends of the two static contact leading-out terminals.

According to some embodiments of the present disclosure, the bottom end surface of the static contact leading-out terminal is a circle, and the position where the static contact leading-out terminal is in contact with the protrusion of the movable contact piece does not exceed a center of the circle.

According to some embodiments of the present disclosure, the DC relay further comprises two first U-shaped yokes respectively arranged on the two first permanent magnets, a U-shaped bottom wall of each of the two first U-shaped yokes is correspondingly in contact with the side of the first permanent magnet facing away from the contact, and two U-shaped side walls of the two first U-shaped yokes are respectively arranged on two sides of the movable contact piece in a width direction and are opposite to the corresponding contacts.

According to some embodiments of the present disclosure, a projection where the movable contacts are fit to the static contacts on a reference horizontal plane falls into a projection of a frame-shaped outline surrounded by the first U-shaped yokes on the reference horizontal plane.

According to some embodiments of the present disclosure, four first permanent magnets are provided, and the four first permanent magnets are arranged outside the two sides of the movable contact piece in a width direction and are opposite to the corresponding contacts, respectively; and polarities of sides of the two first permanent magnets corresponding to the same contact are set to be the same.

According to some embodiments of the present disclosure, the DC relay further comprises two second U-shaped yokes arranged on four first permanent magnets, a U-shaped bottom wall of each of the two second U-shaped yokes corresponds to an outer side of each of the two ends of the movable contact piece in a length direction, and two U-shaped side walls of each of the two second U-shaped yokes are respectively arranged on the two sides of the movable contact piece in a width direction and are in contact with the sides of the first permanent magnets facing away from the corresponding contacts.

According to some embodiments of the present disclosure, the movable contact piece corresponds to a middle portion of each of the first permanent magnets in a height direction.

DETAILED DESCRIPTION

The First Embodiment

Figure 1:
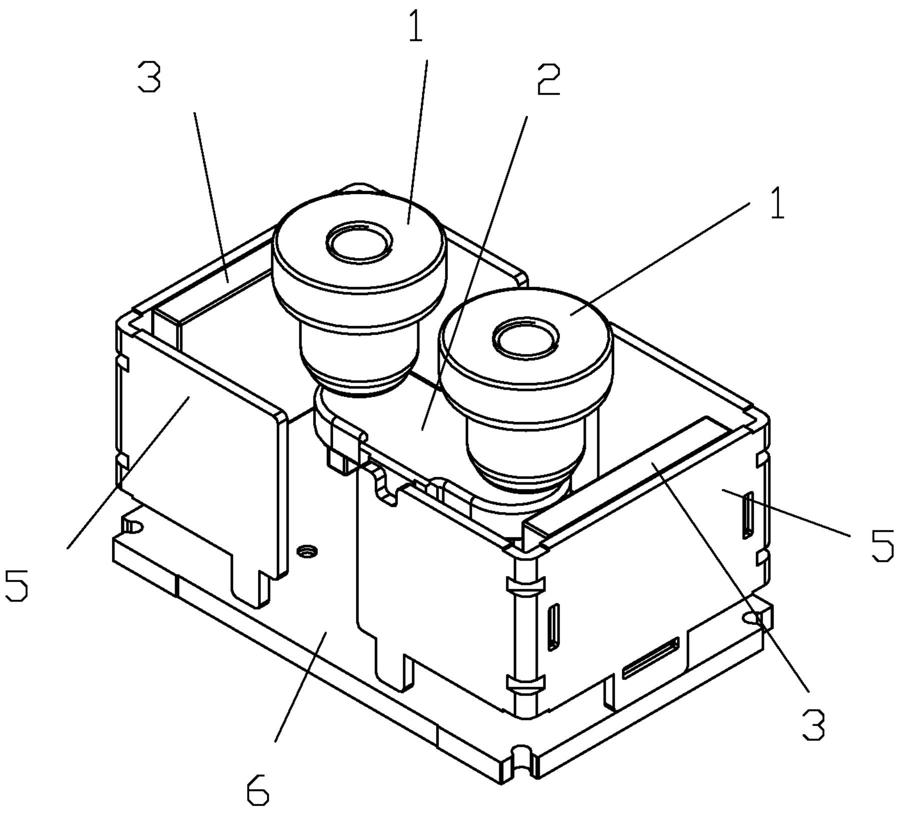
FIG. 1 is a perspective view of a partial configuration according to the first embodiment of the present disclosure.
Figure 2:
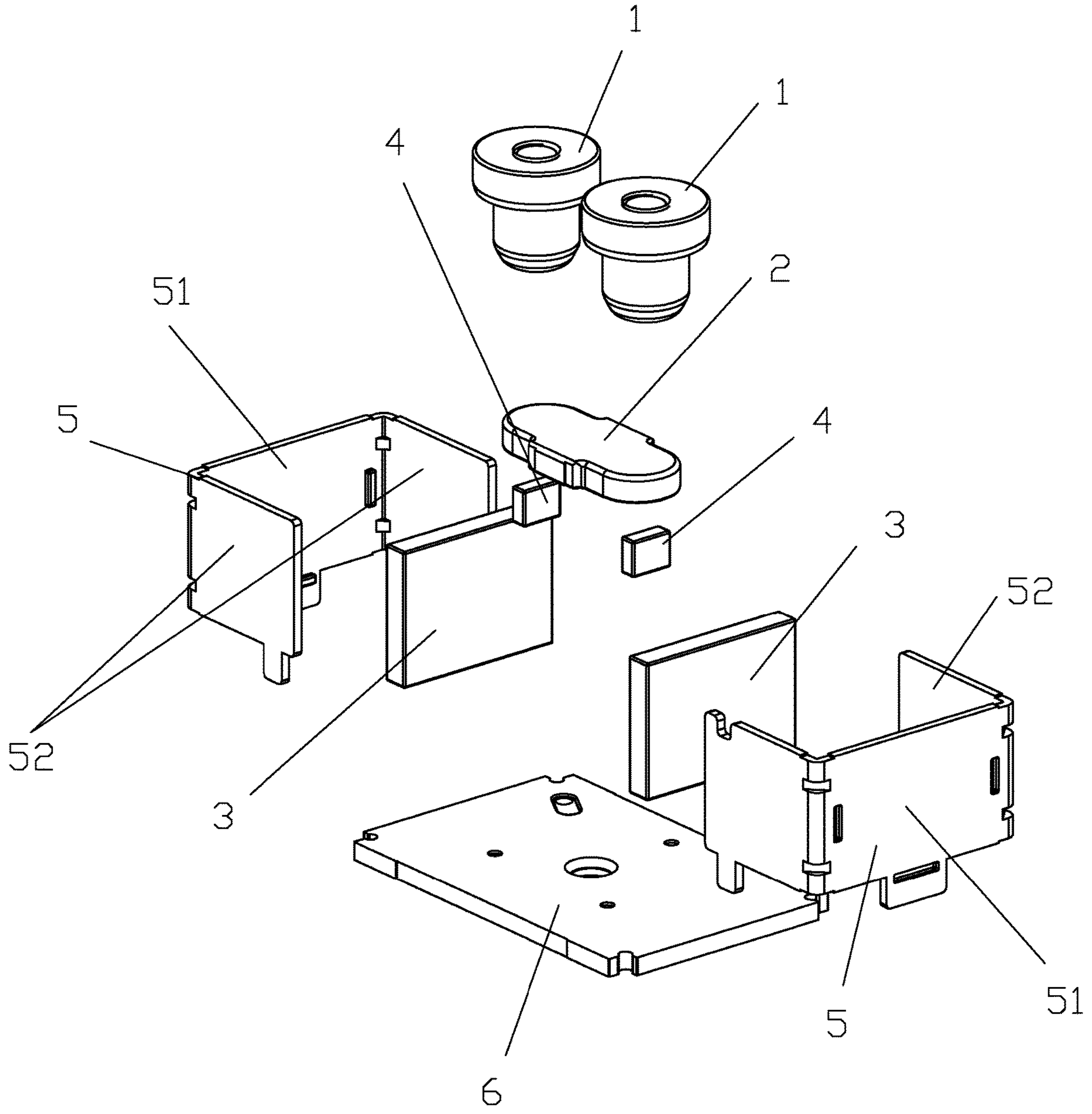
FIG. 2 is an exploded schematic view of the partial configuration according to the first embodiment of the present disclosure.
Figure 3:
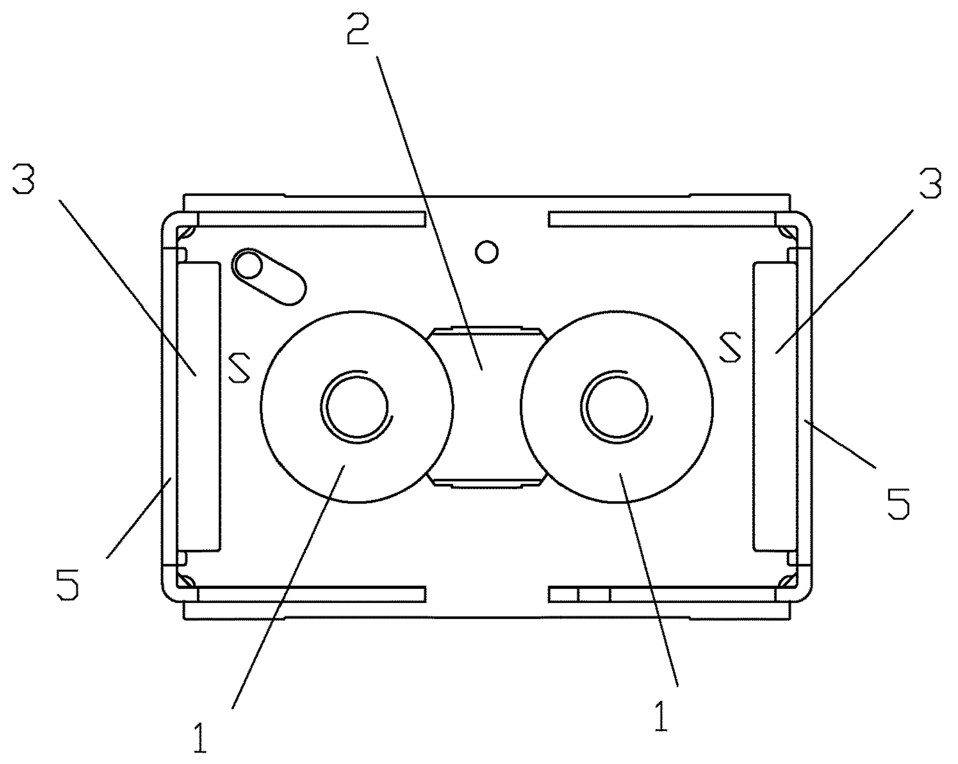
FIG. 3 is a top view of the partial configuration according to the first embodiment of the present disclosure.

Referring to FIGS. 1 to 4, a high-voltage DC relay capable of longitudinally drawing arc according to the present disclosure includes two static contact leading-out terminals 1 and one movable contact piece 2. The movable contact piece 2 is arranged under the two static contact leading-out terminals 1, and both ends of the movable contact piece 2 that are configured as movable contacts are respectively cooperated with the bottom ends of the two static contact leading-out terminals 1 which are configured as static contacts. First permanent magnets 3 are respectively arranged at positions where the static contacts are correspondingly in contact with the movable contacts around the movable contact piece 2, and a side having polarity of the first permanent magnet 3 faces the corresponding static and movable contacts, such that the arc extinction can be implemented using a horizontal magnetic field formed by the first permanent magnets 3. Under the movable contact piece 2, second permanent magnets 4 are arranged at the contact position corresponding to each of the static and movable contacts, and polarity of a side of the second permanent magnet 4 facing the static and movable contacts is opposite to the polarity of the contact-facing sides of the first permanent magnets 3, such that the magnetic field strength at the contacts can be enhanced using a longitudinal magnetic field formed by the first permanent magnets 3 and the second permanent magnets 4 at the static and movable contacts, and further the arc extinction can be implemented.

In this embodiment, there are two first permanent magnets 3, and the two first permanent magnets 3 are respectively arranged outside the two ends of the movable contact piece 2 in a length direction, the two second permanent magnets 4 are respectively arranged on two sides of the movable contact piece 2 in a length, and each of the two second permanent magnets 4 is arranged under a position between a middle portion of the movable contact piece 2 in the length direction and the contact position of the static and movable contacts at the corresponding end of the movable contact piece. A projection of the second permanent magnet 4 on a reference horizontal plane falls into a projection of an area between the two first permanent magnets 3 (i.e., the area surrounded by a connecting line of both sides in a width direction of the two first permanent magnets 3) on the reference horizontal plane.

In this embodiment, the bottom of the two ends of the movable contact piece 2 in the length direction are provided with first grooves 21 that are recessed upward right under the positions where the static contacts are correspondingly in contact with the movable contacts, and the two second permanent magnets 4 are respectively embedded into the first grooves 21 at the two ends of the movable contact piece 2 in the length direction.

Figure 4:
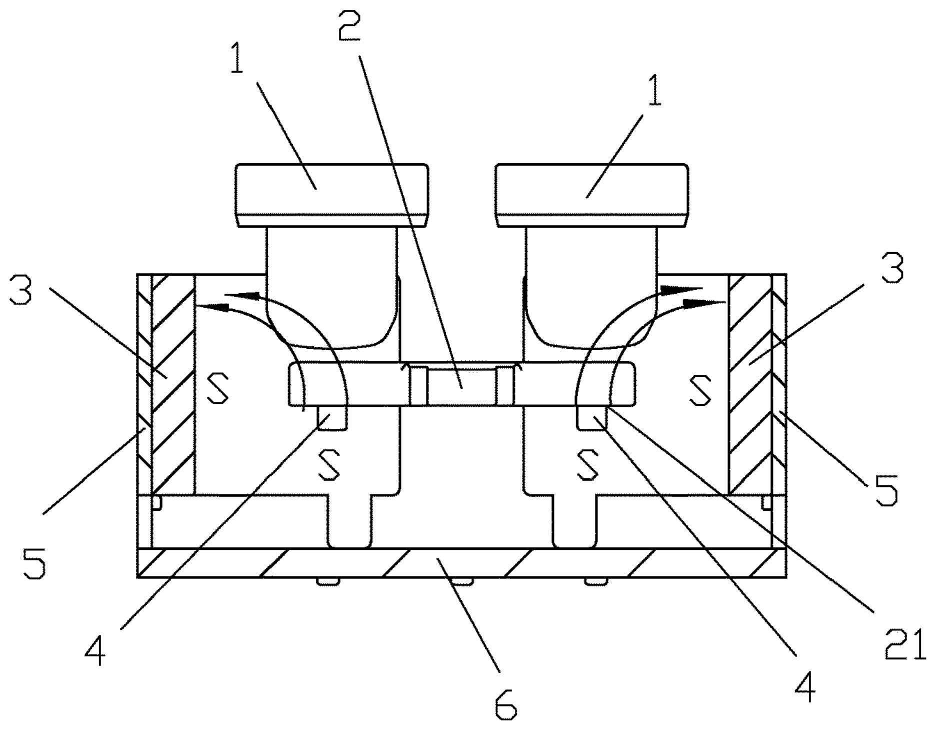
FIG. 4 is a sectional view of the partial configuration according to the first embodiment of the present disclosure.

In this embodiment, as shown in FIG. 4, a magnetic polarity of a contact-facing side of two first permanent magnets 3 corresponding to one end (a left end) of the movable contact piece 2 is referred to as S-pole, and a magnetic polarity of a contact-facing side of two first permanent magnets 3 corresponding to the other end (a right end) of the movable contact piece 2 is referred to as S-pole; a magnetic polarity of a contact-facing side (an upward side) of the second permanent magnet 4 corresponding to one end (a left end) of the movable contact piece 2 is referred to as N-pole, and a magnetic polarity of a contact-facing side (an upward side) of the second permanent magnet 4 corresponding to the end (a right end) of the movable contact piece 2 is referred to as N-pole.

In this embodiment, the DC relay further includes two first U-shaped yokes 5 arranged to the two first permanent magnets 3, wherein each of the U-shaped bottom walls 51 of the two first U-shaped yokes 5 is in contact with one side of the corresponding first permanent magnet 3 facing away from the corresponding contact, and the U-shaped side walls 52 of the two first U-shaped yokes are respectively arranged on two sides of the movable contact piece 2 in the width direction and are opposite to the corresponding contacts.

In this embodiment, projections of the contact positions of the static and movable contacts on the reference horizontal plane fall into the projection of a frame-shaped outline surrounded by the first U-shaped yoke 5 on the reference horizontal plane.

In this embodiment, the movable contact piece 2 corresponds to a middle position in a height direction of the first permanent magnet 3.

In this embodiment, a yoke plate 6 is further arranged under the movable contact piece 2.

According to the high-voltage DC relay capable of longitudinally drawing arc, under the movable contact piece 2, the second permanent magnets 4 are at the contact positions of the static and movable contacts, and the polarity of the side of the second permanent magnet 4 facing the static and movable contacts is opposite to the polarity of the side of the first permanent magnet 3 facing the static and movable contact, such that the magnetic field strength at the contacts can be enhanced using the longitudinal magnetic field formed by the first permanent magnet 3 and the second permanent magnet 4 at the static and movable contacts as indicated by arrows in FIG. 4, and further the arc extinction can be implemented. Such configuration of this disclosure can improve a longitudinal arcing magnetic field, improve a central magnetic field strength of the leading-out terminals, and accelerate a speed of magnetic blowing arc extinction at an arcing moment.

According to the high-voltage DC relay capable of longitudinally drawing arc, two second permanent magnets 4 are respectively embedded into the first grooves 21 at both ends of the movable contact piece 2 in the length direction, that is, the second permanent magnets 4 are located in an area between the lower side of the movable contact piece and the yoke plate 6, and a U-shaped yoke 5 is also arranged on the first permanent magnet. With this configuration of the present disclosure, by utilizing a magnetic collection effect of the yoke plate 6 and the U-shaped yoke 5, the strength of the longitudinal magnetic field between the first permanent magnet 3 and the second permanent magnet 4 can be enhanced, and the longitudinal arcing magnetic field can be further enhanced, the central magnetic field strength of the leading-out terminals can be improved, and the magnetic blowing arc extinction speed at the arcing moment can be further accelerated.

The Second Embodiment

Figure 5:
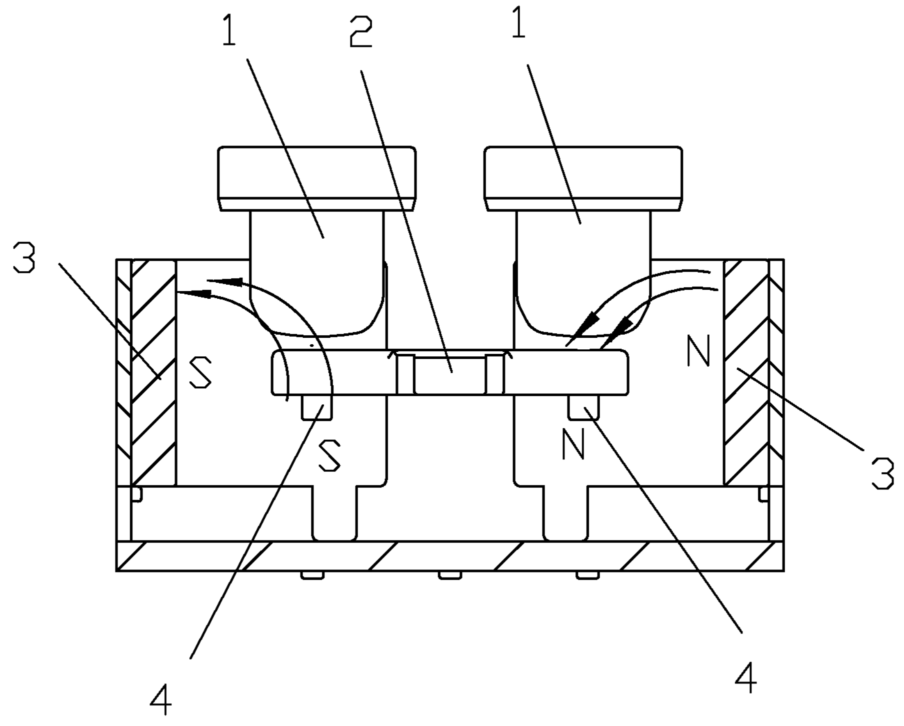
FIG. 5 is a sectional view of a partial configuration according to a second embodiment of the present disclosure.

As shown in FIG. 5, a high-voltage DC relay capable of longitudinally drawing arc according to the present disclosure is different from that of the first embodiment in that magnetic polarities of the contact-facing sides of two first permanent magnets 3 are set to be different, and a magnetic polarity of one contact-facing side of two first permanent magnets 3 corresponding to one end (a left end) of the movable contact piece 2 is configured as S pole, and a magnetic polarity of one contact-facing side of two first permanent magnets 3 corresponding to the other end (a right end) of the movable contact piece 2 is configured as N pole; a magnetic polarity of one contact-facing side (an upward side) of the second permanent magnet 4 corresponding to one end (a left end) of the movable contact piece 2 is configured as N pole, and a magnetic polarity of one contact-facing side (an upward side) of the second permanent magnet 4 corresponding to the other end (a right end) of the movable contact piece 2 is configured as S pole.

The Third Embodiment

Figure 6:
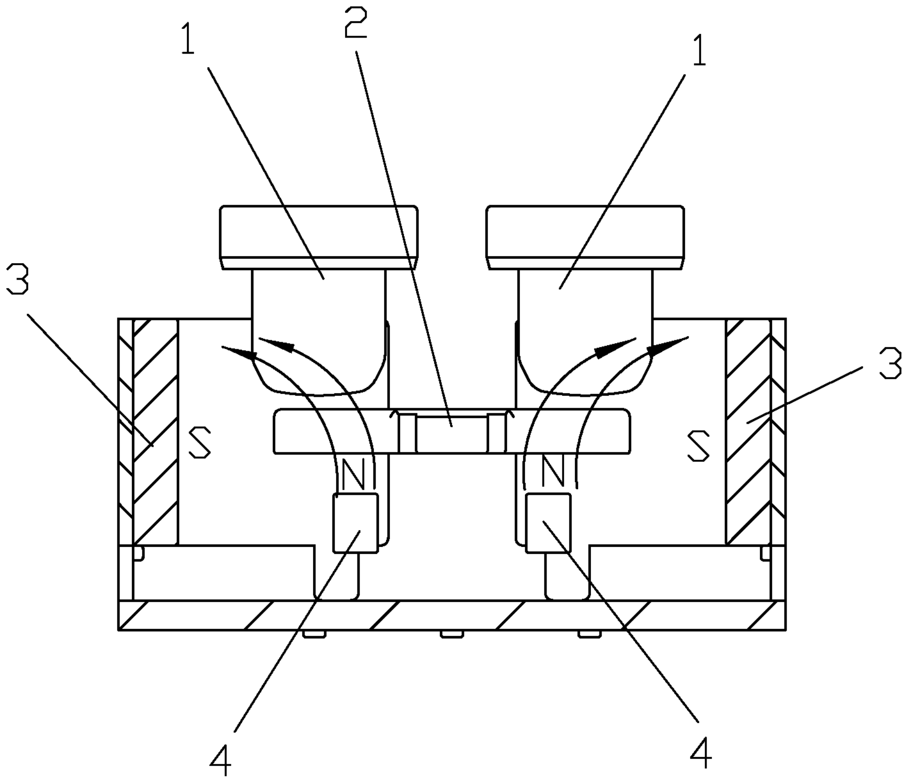
FIG. 6 is a sectional view of a partial configuration according a third embodiment of the present disclosure.

Referring to FIG. 6, a high-voltage DC relay capable of longitudinally drawing arc according to the present disclosure is different from that of the first embodiment in that two second permanent magnets 4 have different installation positions, and the two second permanent magnets 4 are not installed on the bottom of the two ends of the movable contact piece 2 in the length direction, but are installed in an area between the movable contact piece 2 and the yoke plate 6.

Since the second permanent magnet 4 in this embodiment is more downward than the second permanent magnet 4 in the first embodiment in position, it is required to adjust the second permanent magnet 4 horizontally to be close to the middle portion of the movable contact piece 2 in the length direction, instead of being right under the contact positions of the static and movable contacts, to ensure that the magnetic lines of the longitudinal magnetic field formed by the first permanent magnets 3 and the second permanent magnets 4 can pass through the center of the leading-out terminals.

The Fourth Embodiment

Figure 7:
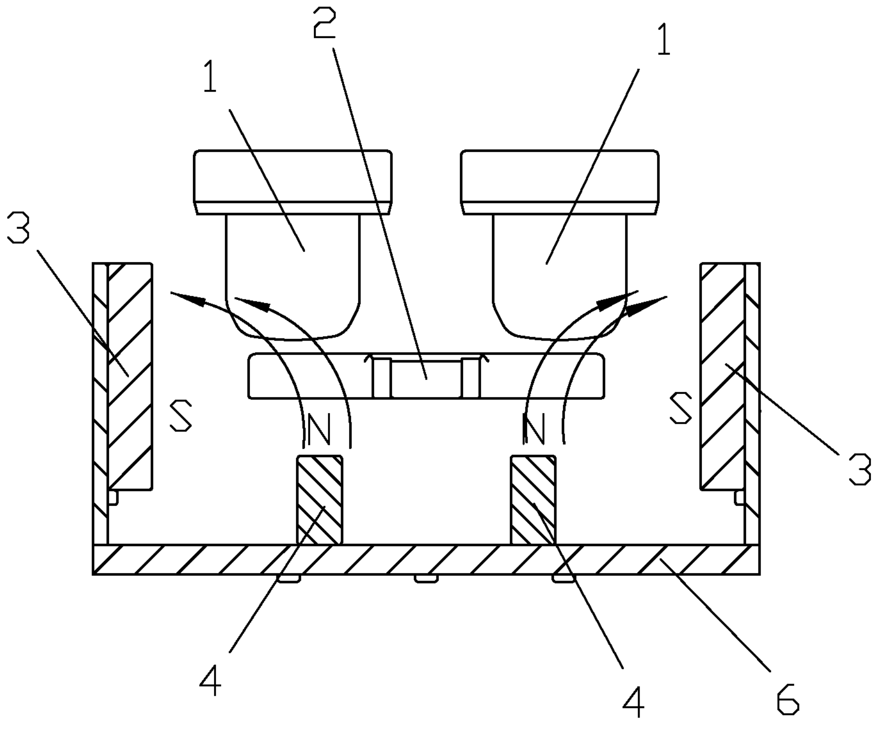
FIG. 7 is a sectional view of a partial configuration according to a fourth embodiment of the present disclosure.

Referring to FIG. 7, a high-voltage DC relay capable of longitudinally drawing arc according to the present disclosure is different from that of the first embodiment in that the two second permanent magnets 4 have different installation positions. The two second permanent magnets 4 are not installed on the bottom of the two ends of the movable contact piece 2 in the length direction, but are installed on the yoke plate 6, respectively.

Since the second permanent magnet 4 in this embodiment is more downward than the second permanent magnet 4 in the first embodiment in position, it is required to adjust the second permanent magnet 4 horizontally to be close to the middle portion of the movable contact piece 2 in the length direction, instead of being right under the contact positions of the static and movable contacts, to ensure that the magnetic lines of the longitudinal magnetic field formed by the first permanent magnets 3 and the second permanent magnets 4 can pass through the center of the leading-out terminals.

According to the high-voltage DC relay capable of longitudinally drawing arc, the second permanent magnets 4 are mounted on the yoke plate 6, and the first U-shaped yokes 5 are arranged on the first permanent magnets 3. With this configuration of the present disclosure, by utilizing a magnetic collection effect of the yoke plate 6 and the U-shaped yoke 5, the strength of the longitudinal magnetic field between the first permanent magnet 3 and the second permanent magnet 4 can be enhanced, and the longitudinal arcing magnetic field can be further enhanced, the central magnetic field strength of the leading-out terminals can be improved, and the magnetic blowing arc extinction speed at the arcing moment can be further accelerated.

The Fifth Embodiment

Figure 8:
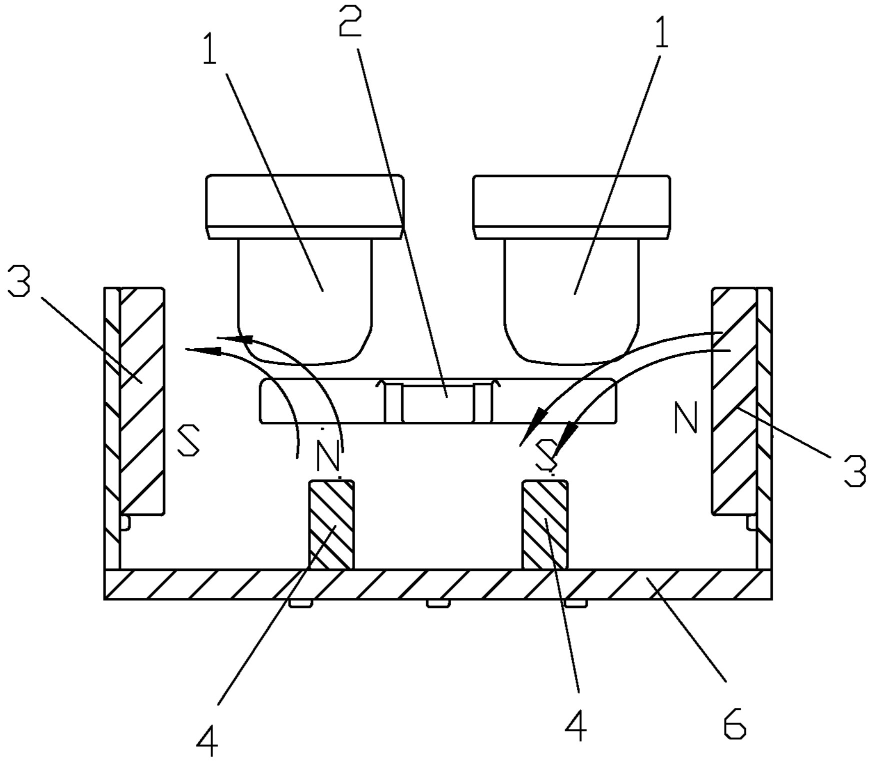
FIG. 8 is a sectional view of a partial configuration according to a fifth embodiment of the present disclosure.
Figure 9:
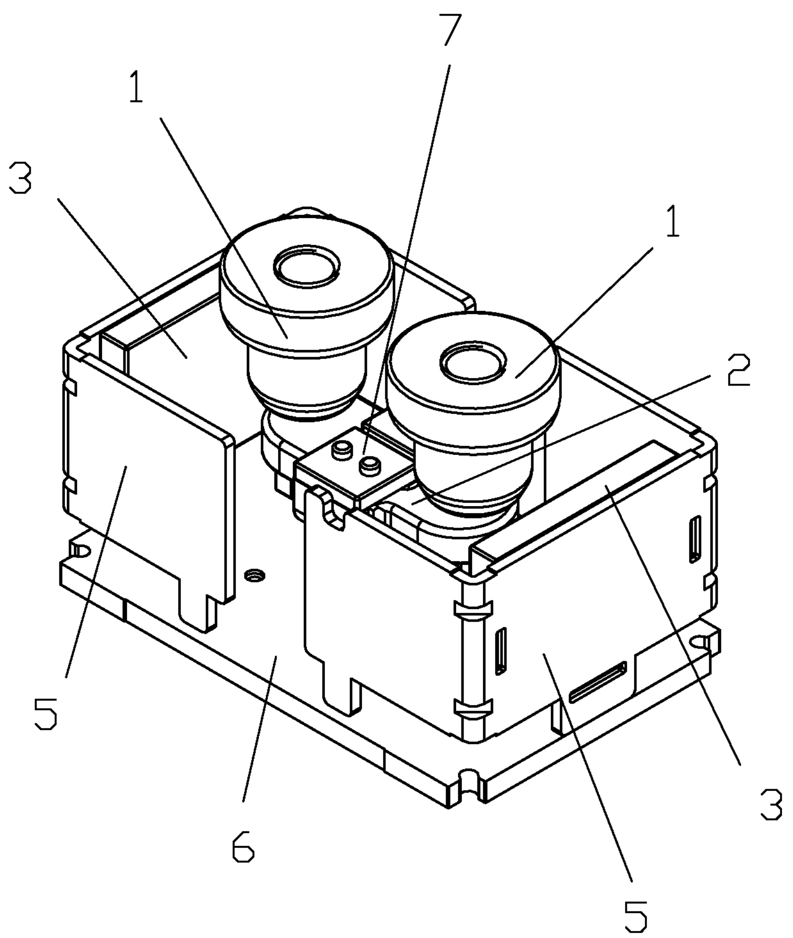
FIG. 9 is a perspective view of a partial configuration according to a sixth embodiment of the present disclosure.
Figure 10:
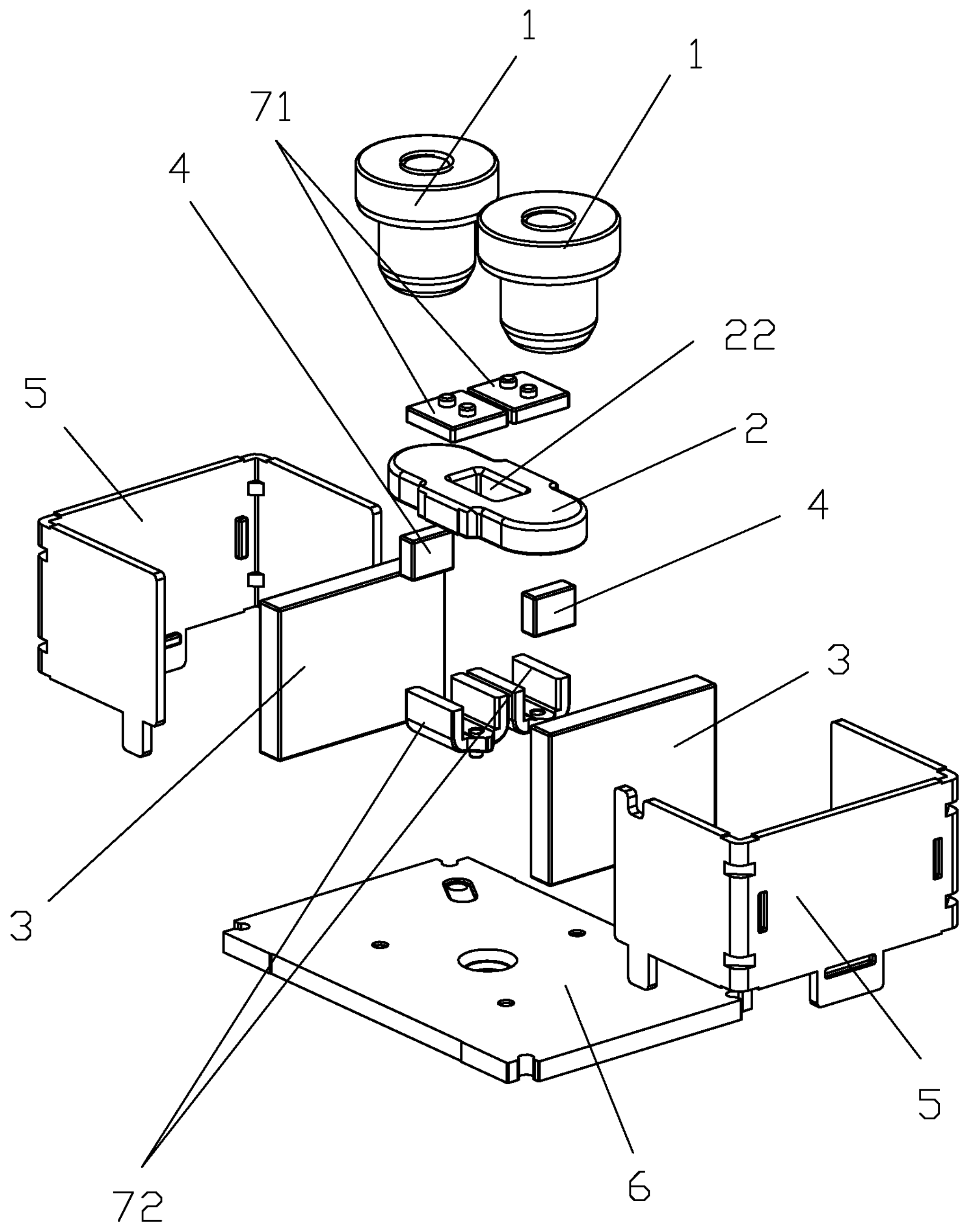
FIG. 10 is an exploded schematic view of the partial configuration according to the sixth embodiment of the present disclosure.
Figure 11:
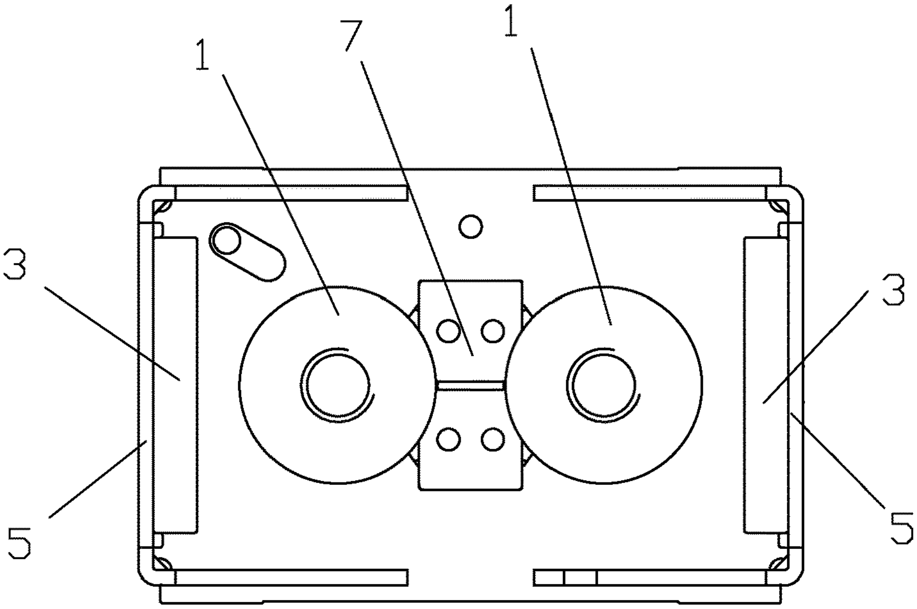
FIG. 11 is a top view of a partial configuration according to the sixth embodiment of the present disclosure.
Figure 12:
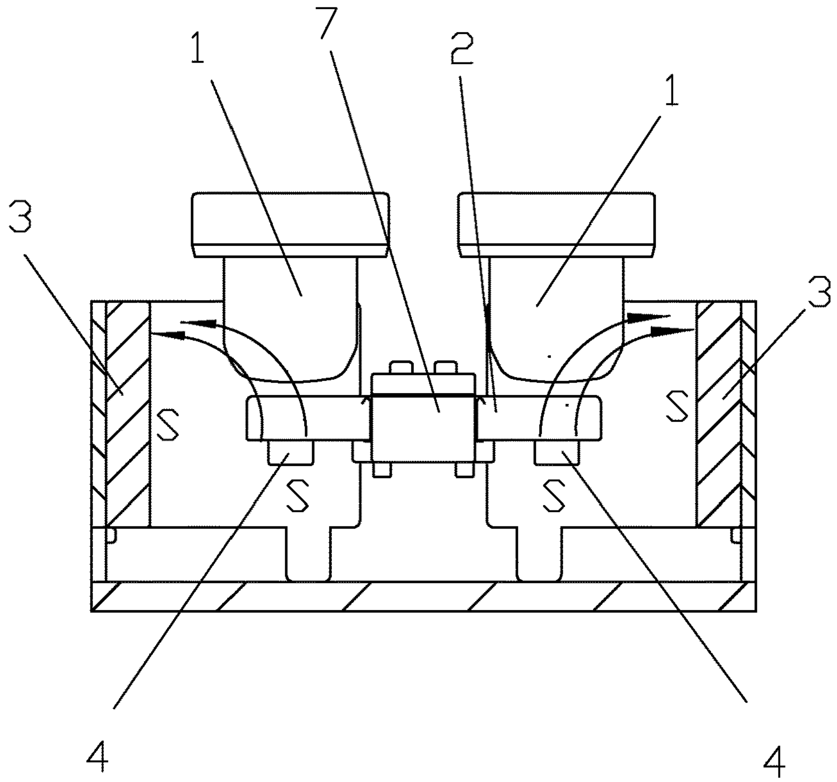
FIG. 12 is a sectional view of the partial configuration according to the sixth embodiment of the present disclosure.

Referring to FIG. 8, a high-voltage DC relay capable of longitudinally drawing arc according to the present disclosure is different from that of the fourth embodiment in that magnetic polarities of the contact-facing sides of two first permanent magnets 3 are set to be different, and a magnetic polarity of one contact-facing side of two first permanent magnets 3 corresponding to one end (a left end) of the movable contact piece 2 is configured as S pole, and a magnetic polarity of one contact-facing side of two first permanent magnets 3 corresponding to the other end (a right end) of the movable contact piece 2 is configured as N pole; a magnetic polarity of one contact-facing side (an upward side) of the second permanent magnet 4 corresponding to one end (a left end) of the movable contact piece 2 is configured as N pole, and a magnetic polarity of one contact-facing side (an upward side) of the second permanent magnet 4 corresponding to the other end (a right end) of the movable contact piece 2 is configured as S pole.

The Sixth Embodiment

Referring to FIG. 9 to FIG. 12, a high-voltage DC relay capable of longitudinally drawing arc according to the present disclosure is different from that of the first embodiment in that an anti-short circuit ring 7 is further installed at the middle position of the movable contact piece 2 in a length, since the anti-short circuit ring 7 is provided, each of the second permanent magnets 4 is arranged between an edge of the anti-short circuit ring 7 and a position that is right under the contact position of the static and movable contacts at the corresponding end thereof, and the second permanent magnets 4 are also embedded into the first grooves 21 of the movable contact piece 2.

In this embodiment, the anti-short circuit ring 7 is formed by the cooperation of two straight line shaped upper armatures 71 and two U-shaped lower armatures 72. A through hole 22 penetrating through the thickness of the movable contact piece 2 is arranged in the middle of the movable contact piece 2 in a length, two straight line shaped upper armatures 71 are usually fixed on the top of a U-shaped bracket of a pushing rod of the relay by riveting or welding, and two U-shaped lower armatures 72 are respectively fixed on the movable contact piece 2 by riveting, and side walls of the two U-shaped lower armatures 72 pass through the through hole 22 of the movable contact piece 2, and the top ends of the two U-shaped lower armatures 72 are exposed out of the upper side of the movable contact piece to be cooperated with the two straight line shaped upper armatures 71, and a closed magnetic loop is formed in an annular piece formed by the straight line shaped upper armatures 71 and the U-shaped lower armatures 72 via an annular magnetic field generated by the movable contact piece being powered, so that the suction force is generated to act on the movable contact piece to achieve a purpose of resisting an electric repulsion. The anti-short circuit ring 7 of this embodiment has two magnetic circuits, so that the magnetic circuit is not easy to saturate, the contact pressure increases more, and the magnetic circuits generate more suction force.

The Seventh Embodiment

Figure 13:
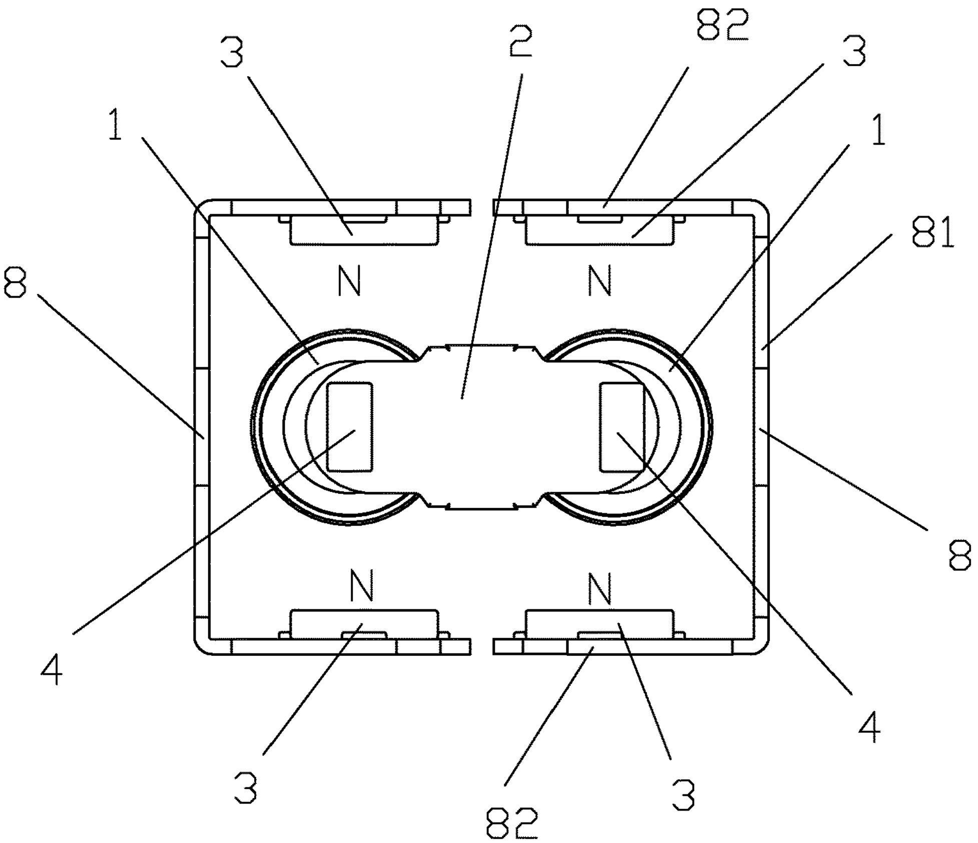
FIG. 13 is a bottom view of a partial configuration according to a seventh embodiment of the present disclosure.
Figure 14:
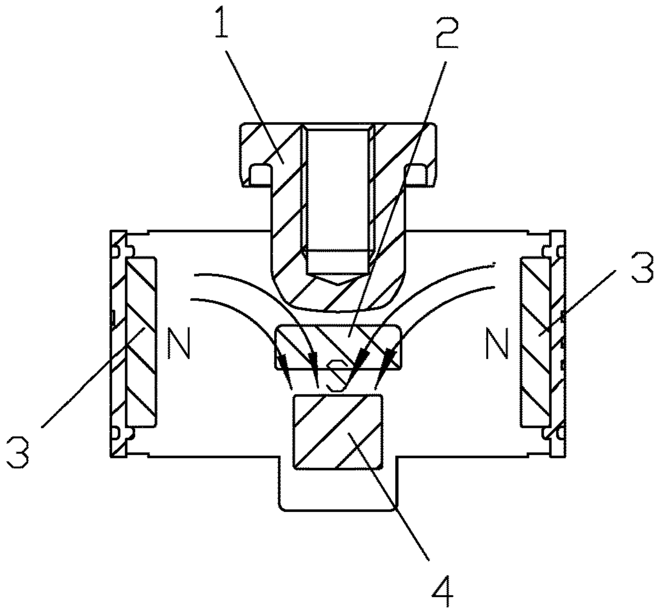
FIG. 14 is a sectional view of the partial configuration according to the seventh embodiment of the present disclosure.

Referring to FIGS. 13 to 14, a high-voltage DC relay capable of longitudinally drawing arc according to the present disclosure is different from that of the first embodiment in that there are four first permanent magnets 3, and the four first permanent magnets 3 are respectively arranged outside the two ends of the movable contact piece 2 and are opposite to the corresponding static and movable contacts, and polarities of sides of the two first permanent magnets 3 facing the same static and movable contacts are set to be the same; and the two second permanent magnets 4 are respectively arranged under the positions where the two static contacts are correspondingly in contact with the movable contacts. A projection of the second permanent magnet 4 on a reference horizontal plane falls into a projection of an area between the two first permanent magnets 3 corresponding to the same static and movable contacts on the reference horizontal plane.

In this embodiment, the two second permanent magnets 4 are located right under the positions where the two static contacts are correspondingly in contact with the movable contacts, and the projection of the second permanent magnets 4 on the reference horizontal plane falls into the projection of the middle connecting lines of the two first permanent magnets corresponding to the same static and movable contacts on the reference horizontal plane.

In this embodiment, the DC relay further includes two second U-shaped yokes 8 arranged on the four first permanent magnets 3, wherein the U-shaped bottom wall 81 of each of the two second U-shaped yokes 8 corresponds to the outer side of each of the two ends of the movable contact piece 2 in the length direction, and the U-shaped side walls 82 of each of the two second U-shaped yokes 8 are respectively arranged on the two sides of the movable contact piece 2 in the width direction and in contact with one side facing away from the corresponding contact of the first permanent magnets 3 at the corresponding position.

In this embodiment, the magnetic polarity of the contact-facing sides of the two first permanent magnets 3 corresponding to one end (a left end) of the movable contact piece 2 is referred to as N pole, and the magnetic polarity of contact-facing sides of the two first permanent magnets 3 corresponding to the other end (a right end) of the movable contact piece 2 is also referred to as N pole; and the magnetic polarity of the contact-facing sides (upper sides) of the second permanent magnets 4 corresponding to one end (a left end) of the movable contact piece 2 is referred to as S pole, and the magnetic polarity of the contact-facing sides (upper sides) of the second permanent magnets 4 corresponding to the other end (a right end) of the movable contact piece 2 is referred to as S pole.

The Eighth Embodiment

Figure 15:
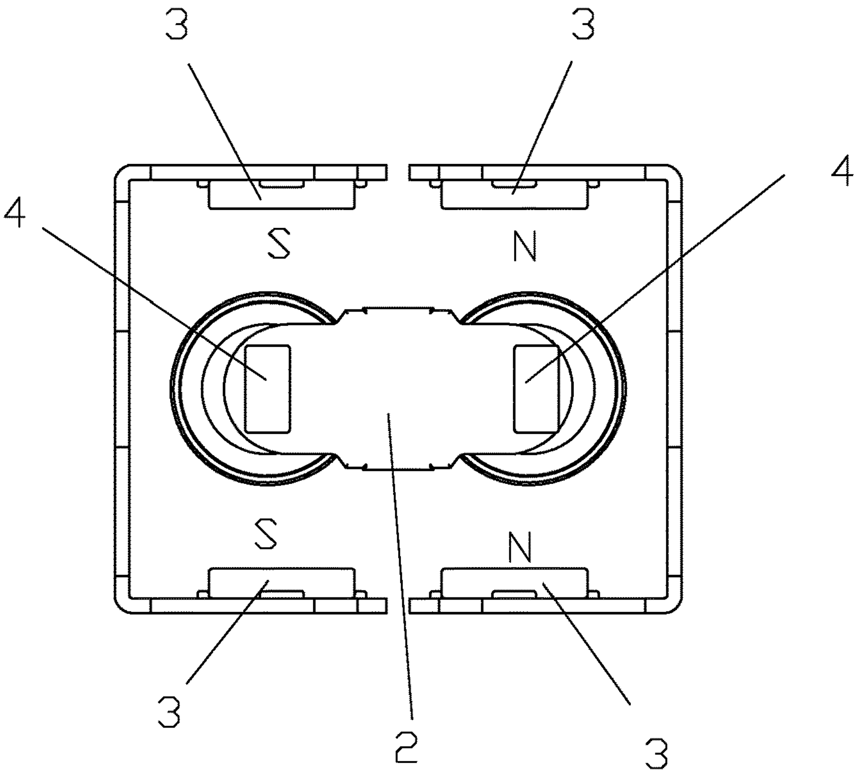
FIG. 15 is a bottom view of a partial configuration according to a eighth embodiment of the present disclosure.

As shown in FIG. 15, a high-voltage DC relay capable of longitudinally drawing arc according to the present disclosure is different from that of the seventh embodiment in that the magnetic polarities of the contact-facing sides of the four first permanent magnets 3 are different, and the magnetic polarity of the contact-facing sides of the two first permanent magnets 3 corresponding to one end (a left end) of the movable contact piece 2 is referred to as S pole, and the magnetic polarity of contact-facing sides of the two first permanent magnets 3 corresponding to the other end (a right end) of the movable contact piece 2 is also referred to as N pole; and a similar adjustment is made to the contact-facing sides of the second permanent magnets 4, the magnetic polarity of the contact-facing sides (upper sides) of the second permanent magnets 4 corresponding to one end (a left end) of the movable contact piece 2 is referred to as N pole, and the magnetic polarity of the contact-facing sides (upper sides) of the second permanent magnets 4 corresponding to the other end (a right end) of the movable contact piece 2 is referred to as S pole.

The Ninth Embodiment

Figure 16:
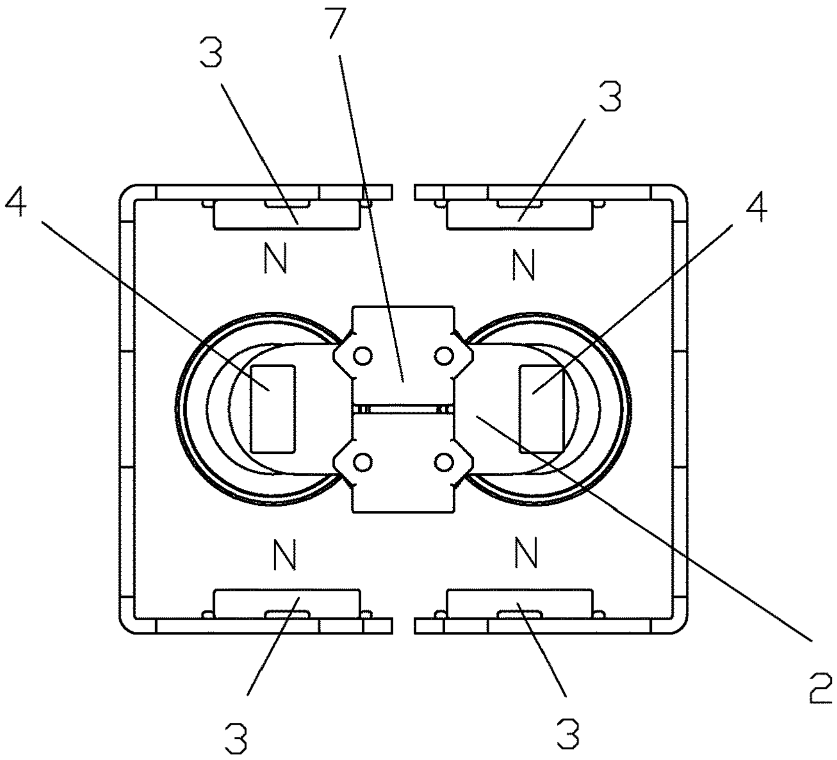
FIG. 16 is a bottom view of a partial configuration according to a ninth embodiment of the present disclosure.
Figure 17:
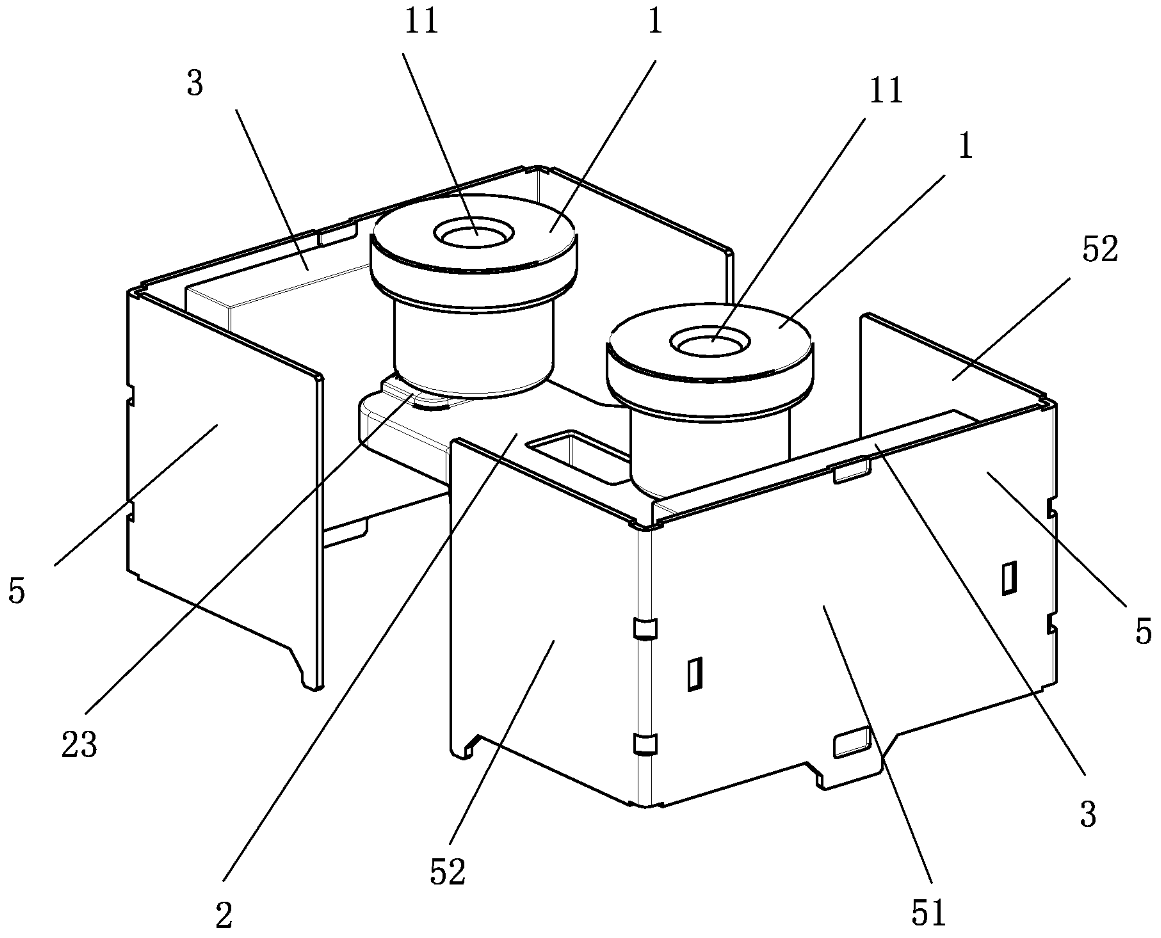
FIG. 17 is a perspective view of a configuration according to a tenth embodiment of the present disclosure.
Figure 18:
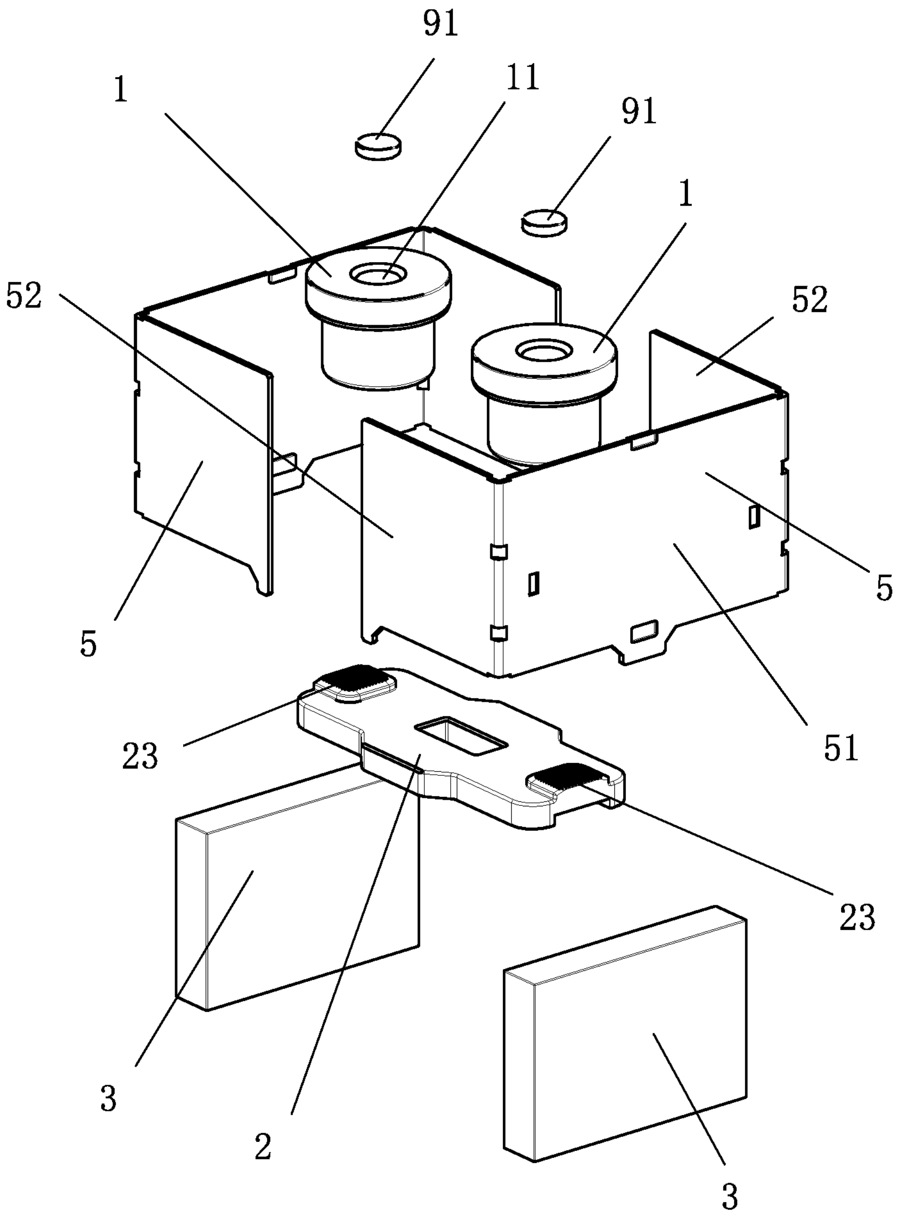
FIG. 18 is an exploded schematic view of the configuration according to the tenth embodiment of the present disclosure.

Referring to FIG. 16, a high-voltage DC relay capable of longitudinally drawing arc according to the present disclosure is different from that of the seventh embodiment in that an anti-short circuit ring 7 is also installed in the middle position of the movable contact piece 2 in the length direction.

The Tenth Embodiment

Figure 19:
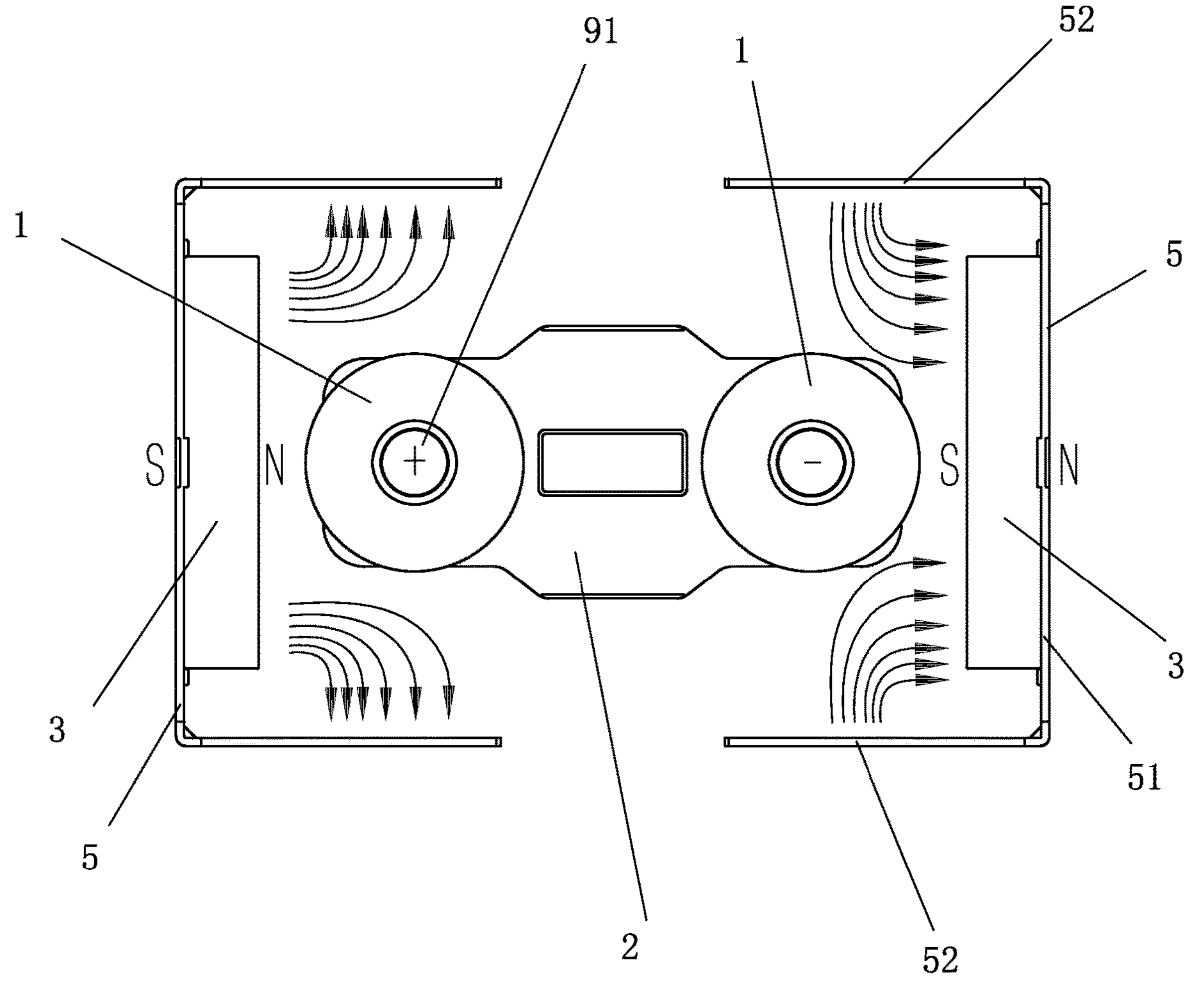
FIG. 19 is a top view of the configuration according to the tenth embodiment of the present disclosure.
Figure 20:
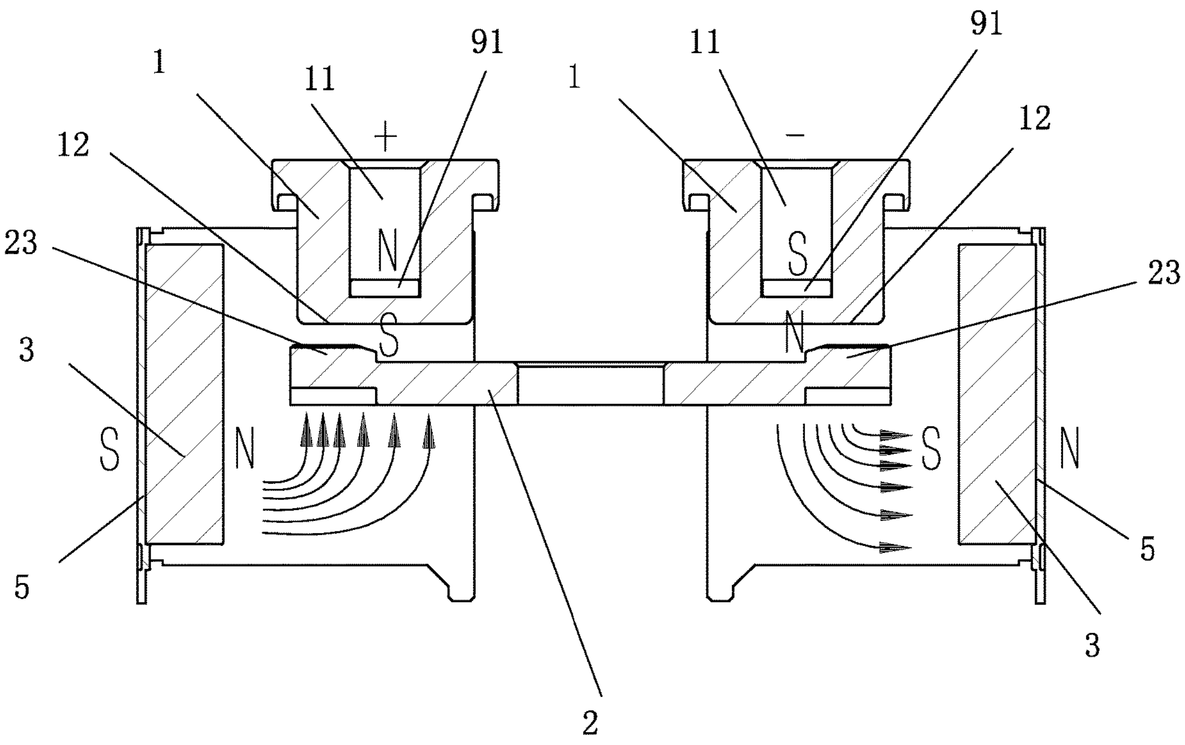
FIG. 20 is a sectional view of the configuration according to the tenth embodiment of the present disclosure, taken along a length direction of the movable contact piece.

Referring to FIG. 17 to FIG. 20, the present disclosure further provides a high-voltage DC relay with permanent magnet arc extinguishing function, including two static contact leading-out terminals 1 and one movable contact piece 2. The movable contact piece 2 is arranged under the two static contact leading-out terminals 1, and both ends of the movable contact piece 2 that are configured as movable contacts are respectively cooperated with the bottom ends of the two static contact leading-out terminals 1 which are configured as static contacts. First permanent magnets 3 are respectively arranged outside the two ends of the movable contact piece 2 in the length direction, and a side having polarity of the first permanent magnet 3 faces the corresponding contacts, such that the arc extinction can be implemented using a horizontal magnetic field formed by each of the first permanent magnets 3 (as shown in FIG. 19). In the two static contact leading-out terminals 1, third permanent magnets 91 are installed on a side facing away from the static contacts, and sides of the third permanent magnets 91 having polarity facing the corresponding contacts, and the polarity of the contact-facing sides of the third permanent magnets 91 is opposite to the polarity of the contact-facing sides of the first permanent magnets, so that the magnetic field strength at the contacts can be enhanced by a longitudinal magnetic field formed by the first permanent magnets 3 and the third permanent magnets 91 (as shown in FIG. 20), and then the arc extinction can be further implemented.

In this embodiment, the magnetic polarity of the contact-facing sides of the first permanent magnets 3 corresponding to one end of the movable contact piece 2 is referred to as N pole, and the magnetic polarity of contact-facing sides of the first permanent magnets 3 corresponding to the other end of the movable contact piece 2 is also referred to as S pole; and the magnetic polarity of the contact-facing sides of the third permanent magnets 91 corresponding to one end of the movable contact piece 2 is referred to as S pole, and the magnetic polarity of the contact-facing sides of the first permanent magnets 3 corresponding to the other end of the movable contact piece 2 is referred to as N pole.

In this embodiment, second grooves 11 that are recessed downwards are provided on the upper ends of the leading-out terminals 1 of the two stationary contacts, respectively. The third permanent magnets 91 are embedded into the second grooves 11 to be close to the corresponding contacts.

In this embodiment, the third permanent magnets 91 are circular; the second groove 11 has a circular cross section corresponding to that of the second permanent magnet; the third permanent magnets 91 are located in the middle of the static contact leading-out terminals 1 in the corresponding same horizontal plane.

In this embodiment, the two movable contacts are protrusions 23 integrally formed at both ends of the movable contact piece 2, and the protrusions 23 at both ends of the movable contact piece 2 are in eccentric contact with the bottom ends of the two static contact leading-out terminals 1, respectively. The protrusion 23 is formed after being struck by the movable contact piece 2 along a thickness direction.

In this embodiment, the protrusions 23 at the two ends of the movable contact piece 2 are respectively arranged at edges of the two ends of the movable contact piece; and the contact positions 12 of the two static contact leading-out terminals 1 and the protrusions 23 at both ends of the movable contact piece are at the opposite outer sides of the bottom ends of the two static contact leading-out terminals.

In this embodiment, the bottom end surface of the static contact leading-out terminals 1 is circular, and the contact position 12 between the static contact leading-out terminals 1 and the protrusion 23 of the movable contact piece 2 does not exceed a center of the circle, that is, the bottom end surface of the static contact leading-out terminals 1 is eccentrically contacted with the protrusion 23 of the movable contact piece 2.

In this embodiment, the movable contact piece 2 corresponds to the middle position in the height of the first permanent magnet 3.

In this embodiment, the DC relay further includes two first U-shaped yokes 5 respectively arranged on two first permanent magnets, wherein the U-shaped bottom walls 51 of the two first U-shaped yokes 5 are respectively in contact with sides facing away from the corresponding contacts of the corresponding first permanent magnets 3, and the U-shaped side walls 52 of the two first U-shaped yokes 5 are respectively arranged on two sides of the movable contact piece 2 in the width direction and are opposite to the corresponding contacts.

In this embodiment, a projection of a position where the movable contacts are cooperated with the stationary contacts on the reference horizontal plane falls into a projection of the frame-shaped outline surrounded by the first U-shaped yokes 5 on the reference horizontal plane.

According to the high-voltage DC relay with permanent magnet arc extinguishing function of the present disclosure, in the two static contact leading-out terminals 1, the third permanent magnets 91 are provided to the side facing away from the static contacts, the side of the third permanent magnet 91 having polarity sides the corresponding contacts, and the polarity of the contact-facing side of the third permanent magnet 91 is opposite to the polarity of the contact-facing side of the first permanent magnet 3, such that the magnetic field strength at the contacts can be enhanced using the longitudinal magnetic field formed by the first permanent magnets 3 and the third permanent magnets 91 at the contacts, and then the arc extinction can be implemented. With such configuration of the present disclosure, the longitudinal arcing magnetic field can be improved, the central magnetic field strength at the leading-out terminals can be improved, and the speed of magnetic blowing arc extinction at the arcing moment can be increased. In this disclosure, two movable contacts are set as protrusions 23 integrally formed at both ends of the movable contact piece 2, and the protrusions 23 at both ends of the movable contact piece 2 are eccentrically contacted with the bottom ends of the two static contact leading-out terminals 1, respectively. With such configuration of the present disclosure, the magnetic field strength at the contacts can be strengthened through the cooperation of the longitudinal arcing magnetic field and the eccentric contacts, and allow the Lorentz force at the arcing point to always side a direction favorable for the arc extinction, thereby improving the arc extinguishing effect.

In this embodiment, the magnetic polarity of the contact-facing sides of the first permanent magnets 3 corresponding to one end of the movable contact piece 2 is referred to as N pole, and the magnetic polarity of contact-facing sides of the first permanent magnets 3 corresponding to the other end of the movable contact piece 2 is also referred to as S pole; and of course, the magnetic polarity of the contact-facing sides of the first permanent magnets 3 corresponding to one end of the movable contact piece 2 is referred to as S pole, and the magnetic polarity of the contact-facing sides of the first permanent magnets 3 corresponding to the other end of the movable contact piece 2 is referred to as N pole, or the contact-facing sides of the two first permanent magnets 3 are all set as N pole or S pole.

The Eleventh Embodiment

Figure 21:
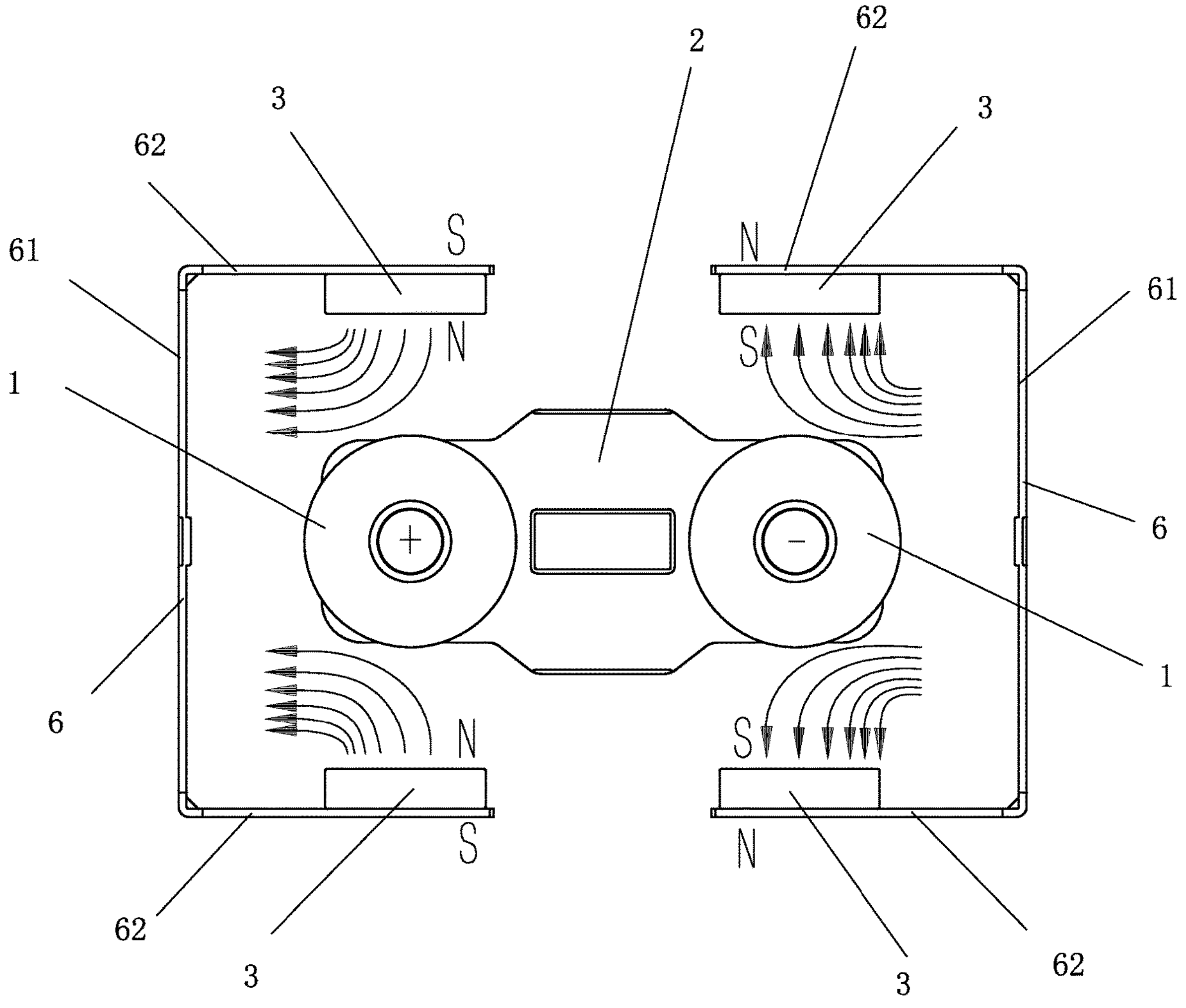
FIG. 21 is a top view of a configuration according to an eleventh embodiment of the present disclosure.
Figure 22:
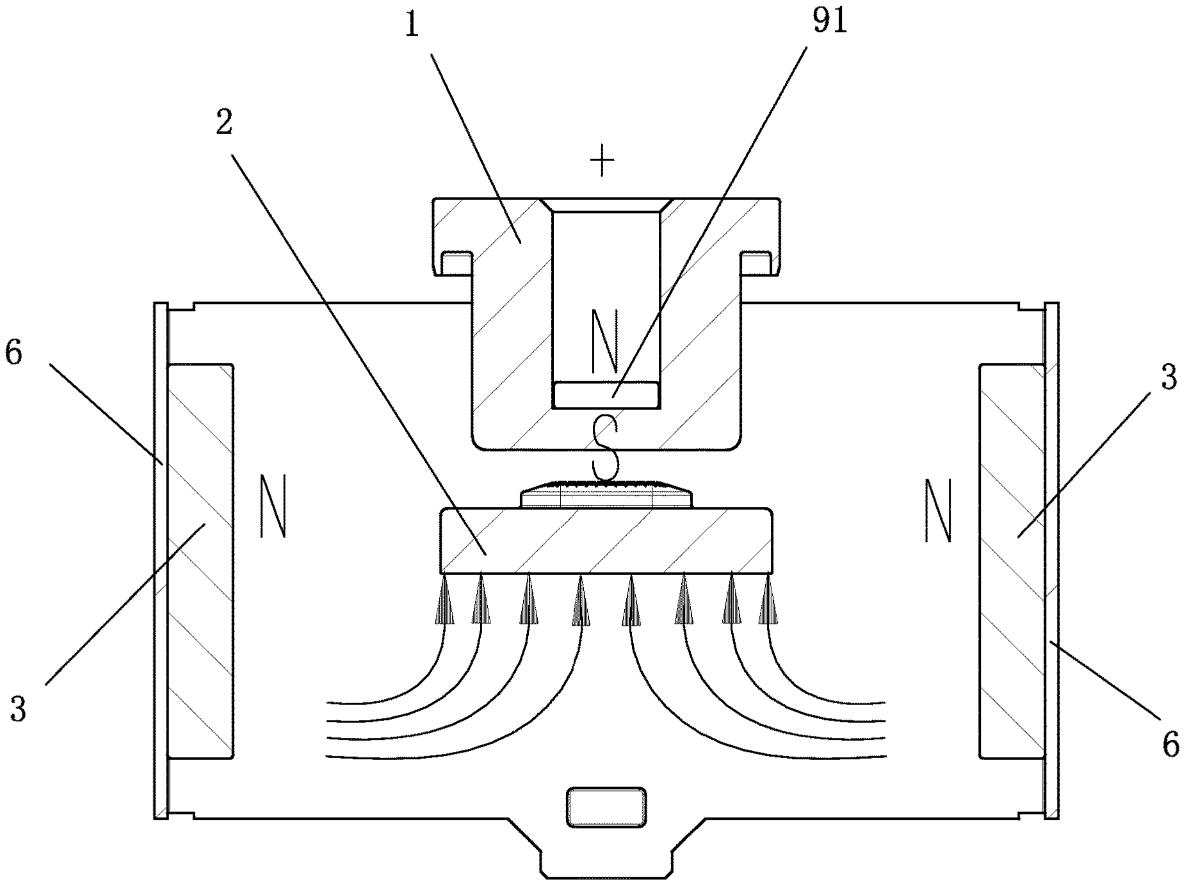
FIG. 22 is a sectional view of the configuration according to the eleventh embodiment of the present disclosure, taken along one of the contacts of the movable contact piece in a width direction.
Figure 23:
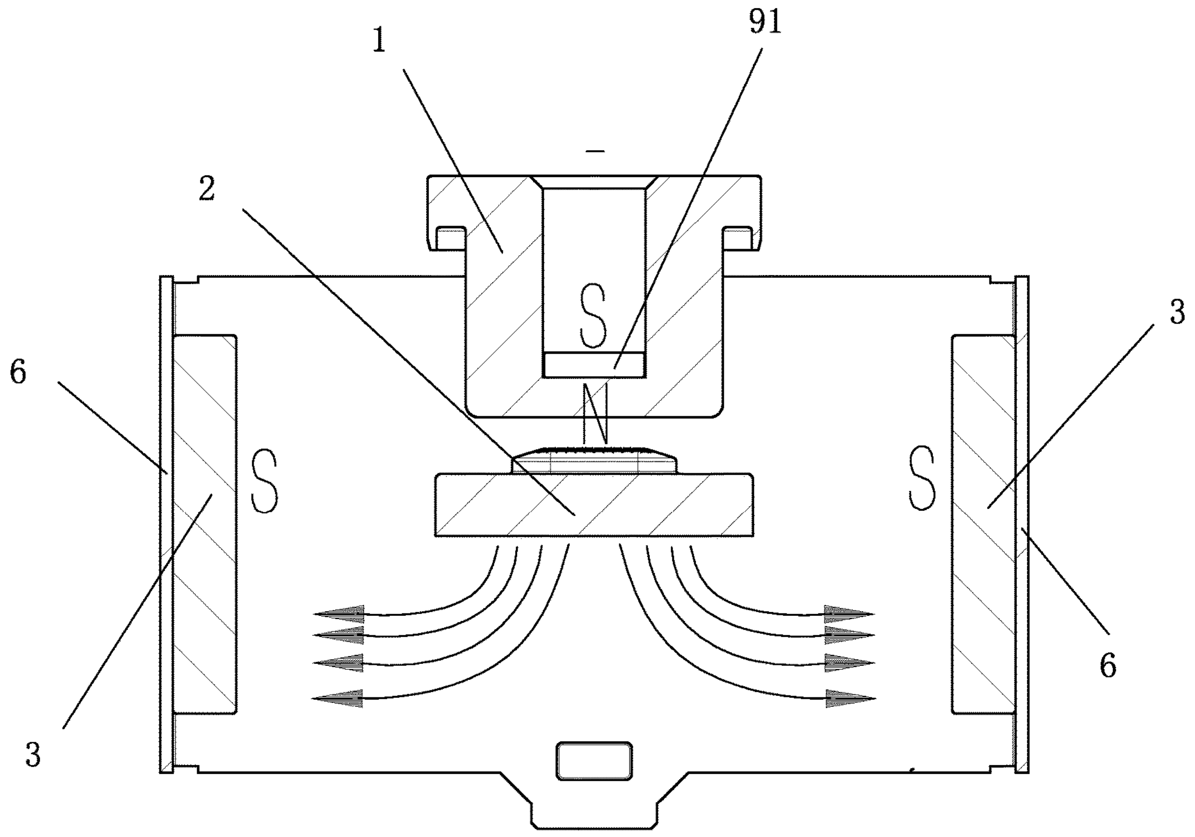
FIG. 23 is a sectional view of the configuration according to the eleventh embodiment of the present disclosure, taken along the other of the contacts of the movable contact piece in a width direction.

Referring to FIG. 21 to FIG. 23, a high-voltage DC relay with permanent magnet arc extinguishing function according to the present disclosure is different from that of the tenth embodiment in that there are four first permanent magnets 3. The four first permanent magnets 3 are respectively arranged outside the two sides of the movable contact piece 2 in the width direction and opposite to the corresponding contacts, and the polarities of the contact-facing sides of the two first permanent magnets 3 corresponding to the same contact are set to be the same.

In this embodiment, the magnetic polarities of contact-facing sides of the two first permanent magnets 3 corresponding to one end of the movable contact piece 2 are referred to as N poles, the magnetic polarities of contact-facing sides of the two first permanent magnets 3 corresponding to the other end of the movable contact piece 2 are referred to as S poles, the magnetic polarities of the contact-facing sides of the third permanent magnets 91 corresponding to one end of the movable contact piece 2 are referred to as S poles, and the magnetic polarities of the contact-facing sides of the first permanent magnets 3 corresponding to the other end of the movable contact piece 2 are referred to as N poles.

In this embodiment, the DC relay further includes two second U-shaped yokes 5 arranged on the four first permanent magnets 3, the U-shaped bottom walls 61 of the two second U-shaped yokes 5 respectively correspond to the outer side of each of the two ends of the movable contact piece 2 in the length direction, and the U-shaped side walls 62 of the two second U-shaped yokes 5 are respectively arranged on the two sides of the movable contact piece 2 in the width direction, and are in contact with one sides facing away from the corresponding contacts of the first permanent magnets 3 at the corresponding positions.

In this embodiment, the magnetic polarities of the contact-facing sides of the two first permanent magnets 3 corresponding to one end of the movable contact piece 2 are referred to as N poles, and the magnetic polarities of the contact-facing sides of the two first permanent magnets 3 corresponding to the other end of the movable contact piece 2 are referred to as S poles; of course, the magnetic polarities of the contact-facing sides of the two first permanent magnets 3 corresponding to one end of the movable contact piece 2 may be referred to as S poles, and the magnetic polarities of the contact-facing sides of the two first permanent magnets 3 corresponding to the other end of the movable contact piece 2 may be referred to as N poles, or the contact-facing sides of the four first permanent magnets 3 may be set as N poles or S poles.

In the case that the contact-facing sides of the four first permanent magnets 3 are set as N poles or S poles, two first permanent magnets 3 on the same side corresponding to the width of the movable contact piece 2 may be connected as a whole.

According to the present disclosure, in the leading out ends of the two static contacts, a third permanent magnet is installed on a side facing away from the static contacts, and has a side with polarity facing the corresponding contact, and the polarity of the side of the third permanent magnet facing the contact is opposite to the polarity of the side of the first permanent magnet facing the contact, to utilize a longitudinal magnetic field formed by the first permanent magnet and the third permanent magnet at the contact and enhance the magnetic field strength at the contact so as to realize the arc extinction. The structure as disclosed by the present disclosure can improve the longitudinal arc striking magnetic field, improve the central magnetic field strength at the leading-out terminals, and accelerate the speed of extinguishing the arc by blowing magnet at the moment of the arc striking.

According to the present disclosure, two movable contacts are configured as protrusions integrally formed at both ends of the movable contact piece, and the protrusions at both ends of the movable contact piece are eccentrically contacted with bottom ends of the leading-out terminals of the two static contacts, respectively. Such configuration of the present disclosure can strengthen the magnetic field strength at the contact points through the cooperation of the longitudinal arc magnetic field and the eccentric contact points, and allow the Lorentz force at an arcing point to always side a direction favorable for the arc extinction, thereby improving the arc extinguishing effect.

The present disclosure will be further described in detail with reference to the accompanying drawings and embodiments; however, the high-voltage DC relay capable of longitudinally drawing arc of the present disclosure is not limited to the embodiments.

The embodiments described above can be combined with one another, and their subcomponents can be combined with one another, so long as a conflict is not present. The description above is only various embodiments of the present disclosure, and is not intended to limit this disclosure in any form. Although the present disclosure has been disclosed above with various embodiments, it is not intended to limit this disclosure. Any skilled person in the art could make possible changes and modifications to the technical solution of this disclosure using the technical contents disclosed above, or equivalent embodiments, without deviating from the scope and spirit of the present disclosure. Therefore, any simple modifications and equivalent changes made to the above embodiments according to the technical solution of this disclosure, which does not depart from the contents of the technical solution of this disclosure, should fall within the protection scope of the present disclosure.

What is claimed is:

1. A high-voltage direct current (DC) relay with permanent magnet arc extinguishing function, comprising:

two static contact leading-out terminals;

a movable contact piece, the movable contact piece being arranged under the two static contact leading-out terminals, and two ends of the movable contact piece functioning as movable contacts being respectively cooperated with bottom ends of the two static contact leading-out terminals functioned as static contacts;

first permanent magnets, the first permanent magnets being respectively arranged at positions corresponding to the static and movable contacts and around the movable contact piece, and a side having polarity of each of the first permanent magnets faces corresponding static and movable contacts such that arc extinction is implemented using a horizontal magnetic field formed by the first permanent magnets; and third permanent magnets, the third permanent magnets being provided on a side facing away from the static contacts in the two static contact leading-out terminals, and sides having polarity of the third permanent magnets face corresponding static and movable contacts, and polarity of the sides facing the static and movable contacts of the third permanent magnets is opposite to polarity of the sides facing the static and movable contacts of the first permanent magnets, such that magnetic field strength at the static and movable contacts can be enhanced by a longitudinal magnetic field formed by the first permanent magnets and the third permanent magnets, and then arc extinction can be implemented.

2. The high-voltage DC relay with permanent magnet arc extinguishing function according to claim 1, wherein second grooves recessed downward are disposed at upper ends of the static contact leading-out terminals, and the third permanent magnets are embedded into the second grooves to be close to corresponding static and movable contacts.

3. The high-voltage DC relay with permanent magnet arc extinguishing function according to claim 2, wherein the third permanent magnet is circular, a section of the second groove is a circular matched with the third permanent magnet, the third permanent magnet is located in a middle of the static contact leading-out terminals in a respective same horizontal plane.

4. The high-voltage DC relay with permanent magnet arc extinguishing function according to claim 3, wherein the two movable contacts are protrusions integrally formed at the two ends of the movable contact piece.

5. The high-voltage DC relay with permanent magnet arc extinguishing function according to claim 4, wherein two first permanent magnets are provided, and the two first permanent magnets are respectively arranged outside the two ends of the movable contact piece in a length direction; the protrusions at the two ends of the movable contact piece are respectively in eccentric contact with the bottom ends of the two static contact leading-out terminals.

6. The high-voltage DC relay with permanent magnet arc extinguishing function according to claim 5, wherein the protrusions at the two ends of the movable contact piece are respectively arranged at edges of the two ends of the movable contact piece; positions where the two static contact leading-out terminals are in contact with the protrusions at the two ends of the movable contact piece are at an opposite outer side of the bottom ends of the two static contact leading-out terminals.

7. The high-voltage DC relay with permanent magnet arc extinguishing function according to claim 6, wherein a bottom end surface of the static contact leading-out terminal is a circle, and the position where the static contact leading-out terminal is in contact with the protrusion of the movable contact piece does not exceed a radius of the circle of the bottom end surface of the static contact leading-out terminal.

8. The high-voltage DC relay with permanent magnet arc extinguishing function according to claim 7, wherein the DC relay further comprises two first U-shaped yokes respectively arranged on the two first permanent magnets, a U-shaped bottom wall of each of the two first U-shaped yokes is correspondingly in contact with the side of the first permanent magnet facing away from the contact, and two U-shaped side walls of the two first U-shaped yokes are respectively arranged on two sides of the movable contact piece in a width direction and are opposite to corresponding static and movable contacts.

9. The high-voltage DC relay with permanent magnet arc extinguishing function according to claim 8, wherein a projection of a fitting position of the movable contacts and the static contacts on a reference horizontal plane falls into a projection of a frame-shaped outline surrounded by the first U-shaped yokes on the reference horizontal plane.

10. The high-voltage DC relay with permanent magnet arc extinguishing function according to claim 3, wherein four first permanent magnets are provided, and the four first permanent magnets are arranged outside the two sides of the movable contact piece in a width direction and are opposite to corresponding static and movable contacts, respectively; and polarities of sides of the two first permanent magnets corresponding to the same static and movable contacts are set to be the same.

11. The high-voltage DC relay with permanent magnet arc extinguishing function according to claim 10, wherein the DC relay further comprises two second U-shaped yokes respectively arranged on four first permanent magnets, a U-shaped bottom wall of each of the two second U-shaped yokes corresponds to an outer side of each of the two ends of the movable contact piece in a length direction, and two U-shaped side walls of each of the two second U-shaped yokes are respectively arranged on the two sides of the movable contact piece in a width direction and are in contact with the sides of the first permanent magnets facing away from corresponding static and movable contacts.

12. The high-voltage DC relay with permanent magnet arc extinguishing function according to claim 1, wherein the movable contact piece corresponds to a middle portion of the first permanent magnets in a height direction.

13. The high-voltage DC relay with permanent magnet arc extinguishing function according to claim 4, wherein four first permanent magnets are provided, and the four first permanent magnets are arranged outside the two sides of the movable contact piece in a width direction and are opposite to corresponding static and movable contacts, respectively; and polarities of sides of the two first permanent magnets corresponding to the same static and movable contacts are set to be the same.

14. The high-voltage DC relay with permanent magnet arc extinguishing function according to claim 13, wherein the DC relay further comprises two second U-shaped yokes respectively arranged on four first permanent magnets, a U-shaped bottom wall of each of the two second U-shaped yokes corresponds to an outer side of each of the two ends of the movable contact piece in a length direction, and two U-shaped side walls of each of the two second U-shaped yokes are respectively arranged on the two sides of the movable contact piece in a width direction and are in contact with the sides of the first permanent magnets facing away from corresponding static and movable contacts.

* * * * *